United States Patent
Yueh et al.

(10) Patent No.: US 10,678,649 B2
(45) Date of Patent: Jun. 9, 2020

(54) INTERFACING WITH A VIRTUAL DATABASE SYSTEM

(71) Applicant: Delphix Corporation, Redwood City, CA (US)

(72) Inventors: Jedidiah Yueh, Menlo Park, CA (US); Xavier David Luiz, Cupertino, CA (US); Yan Wang, Santa Clara, CA (US); Alok Srivastava, Newark, CA (US)

(73) Assignee: Delphix Corporation, Menlo Park, CA (US)

( * ) Notice: Subject to any disclaimer, the term of this patent is extended or adjusted under 35 U.S.C. 154(b) by 94 days.

(21) Appl. No.: 15/722,825

(22) Filed: Oct. 2, 2017

(65) Prior Publication Data

US 2018/0181469 A1    Jun. 28, 2018

Related U.S. Application Data

(63) Continuation of application No. 15/171,331, filed on Jun. 2, 2016, now Pat. No. 9,778,992, which is a
(Continued)

(51) Int. Cl.
*G06F 7/00* (2006.01)
*G06F 17/00* (2019.01)
(Continued)

(52) U.S. Cl.
CPC ........ *G06F 11/1448* (2013.01); *G06F 16/128* (2019.01); *G06F 16/168* (2019.01);
(Continued)

(58) Field of Classification Search
CPC .......... G06F 11/1448; G06F 2201/84
(Continued)

(56) References Cited

U.S. PATENT DOCUMENTS 4,853,843 A    8/1989 Ecklund
5,634,053 A    5/1997 Noble et al.
(Continued)

FOREIGN PATENT DOCUMENTS

CN     1770088        5/2006
CN     101286127 A    10/2008
(Continued)

OTHER PUBLICATIONS

Boppana, U., "Using FlexClone to Clone Files and LUNs," NetApp Technical Report, Mar. 2010, 32 Pages.
(Continued)

*Primary Examiner* — Binh V Ho
(74) *Attorney, Agent, or Firm* — Fenwick & West LLP

(57) ABSTRACT

User interactions with a database storage system allow creation of virtual databases based on point-in-time copies associated with a source database. Multiple point-in-time copies are obtained for each source database. A point-in-time copy retrieves data changed in the source database since the retrieval of a previous point-in-time copy. A virtual database (VDB) is created by creating a set of files in the data storage system and mounting the files on a database server allowing the database server to access the files. User interactions allow the user to specify the source database, a point in time associated with the source database and a destination server to create the virtual database. User input can specify other attributes associated with the virtual database including the file paths, database parameters etc. The user can specify schedules of various actions, including making and retention of point-in-time copies.

18 Claims, 14 Drawing Sheets

Related U.S. Application Data continuation of application No. 14/573,761, filed on Dec. 17, 2014, now Pat. No. 9,389,962, which is a continuation of application No. 13/894,259, filed on May 14, 2013, now Pat. No. 8,949,186, which is a continuation of application No. 13/301,448, filed on Nov. 21, 2011, now Pat. No. 8,468,174.

(60) Provisional application No. 61/418,396, filed on Nov. 30, 2010.

(51) Int. Cl.
  *G06F 11/14* (2006.01)
  *G06F 16/21* (2019.01)
  *G06F 16/11* (2019.01)
  *G06F 16/188* (2019.01)
  *G06F 16/16* (2019.01)

(52) U.S. Cl.
  CPC ............ *G06F 16/188* (2019.01); *G06F 16/21* (2019.01); *G06F 2201/84* (2013.01)

(58) Field of Classification Search
  USPC ........................................................ 707/639
  See application file for complete search history.

(56) References Cited

U.S. PATENT DOCUMENTS

| | | | |
|---|---|---|---|
| 5,680,608 A | 10/1997 | Chang et al. | |
| 5,680,618 A | 10/1997 | Freund | |
| 5,819,292 A | 10/1998 | Hitz et al. | |
| 6,304,882 B1 | 10/2001 | Strellis et al. | |
| 6,523,036 B1 | 2/2003 | Hickman et al. | |
| 6,883,083 B1 | 4/2005 | Kemkar | |
| 6,920,457 B2 | 7/2005 | Pressmar | |
| 6,963,910 B1* | 11/2005 | Belknap ................. H04H 20/82 709/223 | |
| 6,981,114 B1 | 12/2005 | Wu et al. | |
| 7,107,385 B2 | 9/2006 | Rajan et al. | |
| 7,117,259 B1* | 10/2006 | Rohwer .............. H04L 65/4069 709/223 | |
| 7,197,491 B1 | 3/2007 | Chou et al. | |
| 7,222,172 B2 | 5/2007 | Arakawa et al. | |
| 7,225,204 B2 | 5/2007 | Manley et al. | |
| 7,269,607 B2 | 9/2007 | Cotner et al. | |
| 7,334,094 B2 | 2/2008 | Fair | |
| 7,334,095 B1 | 2/2008 | Fair et al. | |
| 7,363,444 B2 | 4/2008 | Ji | |
| 7,373,364 B1 | 5/2008 | Chapman | |
| 7,386,695 B2 | 6/2008 | Fuente | |
| 7,409,511 B2 | 8/2008 | Edwards et al. | |
| 7,457,982 B2 | 11/2008 | Rajan | |
| 7,539,836 B1 | 5/2009 | Klinkner | |
| 7,552,295 B2 | 6/2009 | Kern et al. | |
| 7,587,563 B1 | 9/2009 | Teterin et al. | |
| 7,590,660 B1 | 9/2009 | Richards et al. | |
| 7,631,021 B2 | 12/2009 | Sarma et al. | |
| 7,653,665 B1 | 1/2010 | Stefani et al. | |
| 7,653,794 B2 | 1/2010 | Michael et al. | |
| 7,743,035 B2 | 6/2010 | Chen et al. | |
| 7,757,056 B1 | 7/2010 | Fair | |
| 7,779,051 B2 | 8/2010 | Friedlander et al. | |
| 7,809,769 B2 | 10/2010 | Butcher et al. | |
| 7,822,758 B1 | 10/2010 | Prakash et al. | |
| 7,827,366 B1 | 11/2010 | Nadathur et al. | |
| 7,856,424 B2 | 12/2010 | Cisler et al. | |
| 7,877,357 B1 | 1/2011 | Wu et al. | |
| 7,895,228 B2 | 2/2011 | Cragun et al. | |
| 7,937,547 B2 | 5/2011 | Liu et al. | |
| 7,941,470 B2 | 5/2011 | Le et al. | |
| 7,953,749 B2 | 5/2011 | Sinha et al. | |
| 7,996,636 B1 | 8/2011 | Prakash et al. | |
| 8,037,032 B2 | 10/2011 | Pershin et al. | |
| 8,150,808 B2 | 4/2012 | Zha et al. | |
| 8,161,077 B2 | 4/2012 | Zha et al. | |
| 8,255,915 B1 | 8/2012 | Blanding et al. | |
| 8,280,858 B2 | 10/2012 | Ahrens et al. | |
| 8,311,988 B2 | 11/2012 | Cisler et al. | |
| 8,532,973 B1 | 9/2013 | CaraDonna et al. | |
| 8,775,663 B1 | 7/2014 | Singh | |
| 9,037,543 B2 | 5/2015 | Zha et al. | |
| 9,372,866 B2* | 6/2016 | Provenzano ........ G06F 16/1756 | |
| 9,817,836 B2 | 11/2017 | Zha et al. | |
| 2002/0083037 A1 | 6/2002 | Lewis et al. | |
| 2002/0143764 A1* | 10/2002 | Martin ................. G06F 16/252 | |
| 2003/0204597 A1* | 10/2003 | Arakawa ................ G06F 16/10 709/226 | |
| 2004/0054648 A1* | 3/2004 | Mogi ...................... G06F 16/21 | |
| 2005/0114701 A1 | 5/2005 | Atkins et al. | |
| 2005/0246397 A1 | 11/2005 | Edwards et al. | |
| 2006/0216683 A1* | 9/2006 | Goradia .................. G09B 7/02 434/322 | |
| 2006/0242381 A1 | 10/2006 | Shatskih et al. | |
| 2007/0028187 A1* | 2/2007 | Katsuyama ......... G06F 3/04886 715/810 | |
| 2007/0219959 A1 | 9/2007 | Kanemasa | |
| 2007/0260628 A1 | 11/2007 | Fuchs et al. | |
| 2007/0294215 A1 | 12/2007 | Boss et al. | |
| 2008/0005201 A1 | 1/2008 | Ting et al. | |
| 2008/0034268 A1 | 2/2008 | Dodd et al. | |
| 2008/0154989 A1 | 6/2008 | Arman | |
| 2008/0183973 A1 | 7/2008 | Aguilera et al. | |
| 2008/0256314 A1 | 10/2008 | Anand et al. | |
| 2008/0306904 A1 | 12/2008 | Fukuda et al. | |
| 2008/0307345 A1 | 12/2008 | Hart et al. | |
| 2009/0019246 A1 | 1/2009 | Murase | |
| 2009/0055604 A1 | 2/2009 | Lemar et al. | |
| 2009/0080398 A1 | 3/2009 | Mahany et al. | |
| 2009/0132611 A1 | 5/2009 | Brown et al. | |
| 2009/0132616 A1 | 5/2009 | Winter et al. | |
| 2009/0144224 A1* | 6/2009 | Phan ...................... G06F 3/0647 | |
| 2009/0177697 A1 | 7/2009 | Gao et al. | |
| 2009/0222496 A1 | 9/2009 | Liu et al. | |
| 2009/0292793 A1 | 11/2009 | Miloushev et al. | |
| 2010/0070476 A1 | 3/2010 | O'Keefe et al. | |
| 2010/0125844 A1 | 5/2010 | Mousseau et al. | |
| 2010/0131959 A1 | 5/2010 | Spiers et al. | |
| 2010/0174684 A1 | 7/2010 | Schwaab et al. | |
| 2011/0004586 A1 | 1/2011 | Cherryholmes et al. | |
| 2011/0004676 A1 | 1/2011 | Kawato | |
| 2011/0093435 A1* | 4/2011 | Zha ....................... G06F 16/951 707/639 | |
| 2011/0093436 A1* | 4/2011 | Zha ....................... G06F 16/178 707/639 | |
| 2011/0161973 A1* | 6/2011 | Klots .................... H04L 47/805 718/104 | |
| 2014/0180788 A1* | 6/2014 | George ............... G06Q 30/0269 705/14.41 | |

FOREIGN PATENT DOCUMENTS

| | | |
|---|---|---|
| CN | 101441582 A | 5/2009 |
| CN | 101473309 A | 7/2009 |
| JP | 2000-047919 A | 2/2000 |
| JP | 2004-110218 A | 4/2004 |
| JP | 2005-532611 A | 10/2005 |
| JP | 2009-530756 A | 8/2009 |

OTHER PUBLICATIONS

Chapman et al., "SnapMirror.RTM. Best Practices Guide, NetApp, Inc. Technical Report TR-3446," Apr. 2006, 63 Pages.

Chinese Second Office Action, Chinese Application No. 201180043780.2, dated Oct. 20, 2014, 6 pages.

Creek, T., "Applications for Writeable LUNs and LUN Cloning in Oracle Environments," NetApp, Technical Report, Jun. 2003, 10 Pages.

Declaration of Erez Zadok in Support of Petition for Inter Partes Review of U.S. Pat. No. 8,150,808, Oct. 2, 2014, 78 Pages.

Declaration of Erez Zadok in Support of Petition for Inter Partes Review of U.S. Pat. No. 8,150,808, Oct. 2, 2014, 84 Pages.

(56) References Cited

OTHER PUBLICATIONS

Declaration of Erez Zadok in Support of Petition for Inter Partes Review of U.S. Pat. No. 8,150,808, Oct. 2, 2014, 85 Pages.
Declaration of Erez Zadok in Support of Petition for Inter Partes Review of U.S. Pat. No. 8,150,808, Oct. 6, 2014, 97 Pages.
Declaration of Erez Zadok in Support of Petition for Inter Partes Review of U.S. Pat. No. 8,161,077, Oct. 6, 2014, 87 Pages.
Declaration of Erez Zadok in Support of Petition for Inter Partes Review of U.S. Pat. No. 8,161,077, Oct. 6, 2014, 95 Pages.
Declaration of Erez Zadok in Support of Petition for Inter Partes Review of U.S. Pat. No. 8,468,174, Oct. 23, 2014, 98 Pages.
Declaration of Erez Zadok in Support of Petition for Inter Partes Review of U.S. Pat. No. 8,468,174, Oct. 23, 2014, 99 Pages.
Declaration of Erez Zadok in Support of Petition for Inter Partes Review of U.S. Pat. No. 8,548,944, Oct. 7, 2014, 98 Pages.
Declaration of Erez Zadok in Support of Petition for Inter Partes Review of U.S. Pat. No. 8,548,944, Oct. 8, 2014, 98 Pages.
Declaration of Erez Zadok in Support of Petition for Inter Partes Review of U.S. Pat. No. 8,566,361, Oct. 21, 2014, 84 Pages.
Declaration of Erez Zadok in Support of Petition for Inter Partes Review of U.S. Pat. No. 8,566,361, Oct. 21, 2014, 99 Pages.
Degwekar, A., "Using SnapMirror with SnapDrive for UNIX," NetApp Technical Report, 2007, 11 Pages.
Edwards, J.K. et al., "FlexVol: Flexible, Efficient File Volume Virtualization in WAFL," 2008 USENIX Annual Technical Conference, Jun. 22, 2008, 22 Pages.
Final Written Decision, Before the Patent Trial and Appeal Board of United States Patent and Trademark Office, Case IPR2015-00014, U.S. Pat. No. 8,150,808 B2, dated Apr. 13, 2016, 92 Pages.
Final Written Decision, Before the Patent Trial and Appeal Board of United States Patent and Trademark Office, Case IPR2015-00016 & IPR2015-00019, U.S. Pat. No. 8,150,808 B2, dated Apr. 13, 2016, 107 Pages.
Final Written Decision, Before the Patent Trial and Appeal Board of United States Patent and Trademark Office, Case IPR2015-00025 & IPR2015-000261, U.S. Pat. No. 8,161,077 B2, dated Apr. 12, 2016, 94 Pages.
Final Written Decision, Before the Patent Trial and Appeal Board of United States Patent and Trademark Office, Case IPR2015-00034, U.S. Pat. No. 8,150,808 B2, dated Apr. 16, 2016, 100 Pages.
Final Written Decision, Before the Patent Trial and Appeal Board of United States Patent and Trademark Office, Case IPR2015-00050, U.S. Pat. No. 8,548,944 B2, dated Mar. 31, 2016, 26 Pages.
Final Written Decision, Before the Patent Trial and Appeal Board of United States Patent and Trademark Office, Case IPR2015-00052, U.S. Pat. No. 8,548,944 B2, dated Mar. 31, 2016, 25 Pages.
Final Written Decision, Before the Patent Trial and Appeal Board of United States Patent and Trademark Office, Case IPR2015-00108, U.S. Pat. No. 8,566,361 B2, dated Apr. 29, 2016, 61 Pages.
Final Written Decision, Before the Patent Trial and Appeal Board of United States Patent and Trademark Office, Case IPR2015-00108, U.S. Pat. No. 8,566,361 B2, dated May 11, 2016, 57 Pages.
Final Written Decision, Before the Patent Trial and Appeal Board of United States Patent and Trademark Office, Case IPR2015-00128, U.S. Pat. No. 8,468,174 B1, dated Apr. 27, 2016, 74 Pages, Paper 61.
Final Written Decision, Before the Patent Trial and Appeal Board of United States Patent and Trademark Office, Case IPR2015-00128, U.S. Pat. No. 8,468,174 B1, dated Apr. 27, 2016, 74 Pages, Paper 8.
First Office Action for Chinese Patent Application No. CN 201080058431.3, dated May 7, 2014, 24 Pages.
"FlexClone" Datasheet, Network Appliance, Inc., 2008, 2 Pages.
"FlexVol.TM. abd FlexClone.TM. Software," Datasheet, Network Appliance, Inc., 2004, 2 Pages.
Gmane, Discussion regarding "File level snapshots in ZFS," From the zfs-discuss©opensolaris.org mailing list, Mar. 30, 2007, 2 Pages, Can be retrieved at <URL:http://article.gmane.org/gmane.os.solaris.opensolaris.zfs/7759/ma- tch=snapshot>.
Gmane, Discussion regarding "ZFS Clone Promotion [PSARC/2006/303 Timeout: May 12, 2006]," From the zfs-discuss©opensolaris.org mailing list, May 10, 2006, 1 Page, Can be retrieved at<URL:http://article.gmane.org/gmane.os.solaris.opensolaris.zfs/229/mat- ch=zfs+clone+promotion>.
Gmane, Discussion regarding "ZFS promotions," From the zfs-discuss©opensolaris.org mailing list, Dec. 12, 2008, 2 Pages, Can be retrieved at <URL:http://article.gmane.org/gmane.os.solaris.opensolaris.zfs/22347/match=clone>.
Gmane, Discussion regarding "ZFS snapshot improvement," From the zfs-discuss©opensolaris.org mailing list, May 10, 2006, 1 Page, Can be retrieved at <URL:http://article.gmane.org/gmane.os.solaris.opensolaris.zfs/232/match=snapshot>.
Hansen, J., et al., "Lithium: Virtual Machine Storage for the Cloud," In SoCC'10-Proceedings of the 1st AVN Symposium on Cloud Computing, Jun. 10-11, 2010, 21 Pages, [online] [retrieved on Nov. 16, 2011]. Retrieved from the Internet <URL: http://vmwareJe/files/pdf/partners/academiC/ vmware-academic-socc055-hansen-wp.pdf >.
Harbow, L., "Precisely administrate the virtual environment of hybrid type, Part 2: Thorough review of top 5 products of "High-availability plus Disaster-Recovery" for the virtual environment," Computerworld, Japan, Kabushiki Kaisha IDG Japan, Jan. 1, 2009, vol. 6, No. 1, pp. 42-51. (English Translation Is Not Readily Available).
Higgins, B., et al., "Backup and Recovery Snap Manager for SQL Server," DLA Piper, Nov. 2008, 37 Pages.
Hitz, D., et al., "File System Design for an NFS File Server Appliance," Technical Report, USENIX, Winter 1994, 23 Pages.
IBM, "IBM System Storage SAN Volume Controller Software V4.3.0 introduces space-efficient VDisks and VDisk mirroring," IBM United States Announcement 208-114, May 13, 2008, 17 Pages.
Jackson, J., "ZFS: The future for storage networks?; File system has massive capacity, but licensing issues and architectural concerns persist," Government Computer News, Media, Inc., Jun. 25, 2007, 2 Pages.
Kakinoki, T., et al., "Query Language for Enterprise Data Integration in SaaS Environment," Institute of Electronics, Information and Communication Engineers, Data Engineering Workshop Collected Papers No. 19, (DEWS 2008 C3-1), Japan, The Institute of Electronics, Information and Communication Engineers, Data Engineering Research Committee, Apr. 7, 2008, 4 Pages. (With English Abstract).
Kay, D., "Working with ZFS Snapshots," Solaris 10 How-To Guides, Version 1.0, Sun Microsystems, Inc., Jan. 5, 2009, 8 Pages.
Kilvansky, M., "A Thorough Introduction to FlexClone Volumes," NetApp, Technical White Paper, Oct. 2004, 35 Pages.
Lal, J., et al., "DB2: Cloning a Database using NetApp FlexClone Technology," NetApp, Apr. 30, 2006, 60 Pages.
Meeks, J., "An Oracle Technical White Paper-Oracle Data Guard with Oracle Database 11g Release 2," Oracle, Sep. 2009, 20 Pages.
Merrill, J., et al., "SnapVault Best Pratices Guide," NetApp Technical Report, 2008, 29 Pages.
Microsoft, Microsoft Developer's Network, "Pages and Extents," Microsoft Corporation ("Pages and Extents") Sep. 2007, 2 Pages.
Mullins, "Excerpts of DB2 Developer's Guide, Fifth Ed." May 2004, 5 Pages.
Nadgir, N., "Databases and ZFS," Oracle Blog, Sep. 25, 2006, 8 Pages, Can be retrieved from <URL:https://blog.oracle.com/realneel/entry/zfs.sub.-and.sub.-databa- ses>.
"NetApp SnapManager for Oracle," Datasheet, Network Appliance, Inc., 2008, 2 Pages.
"NetApp SnapMirror," Datasheet, Network Appliance, Inc., 2008, 2 Pages.
"NetApp Snapshot Technology," Datasheet, Network Appliance, Inc., 2004, 1 Page.
NetApp, "Datasheet FlexClone," NetApp Technical Doc, 2008, 2 Pages.
NetApp, "Datasheet Flexvol.TM. and FlexClone.TM. Software," NetApp Technical Doc, 2004, 2 Pages.
NetApp, "Datasheet Netapp SnapManager for Oracle," NetApp Technical Doc, 2008, 2 Pages.

(56) References Cited

OTHER PUBLICATIONS

NetApp, "Datasheet NetApp SnapMirror," NetApp Technical Doc, 2008, 2 Pages.
NetApp, "Datasheet NetApp Snapshot Technology," NetApp Technical Doc, 2004, 1 Page.
NetApp, 2007 NetApp, Inc., Data ONTAP 7.1 Data Protection Online Backup and Recovery Guide, NetApp Technical Doc, Jan. 12, 2007, pp. 508.
Network Appliance, Inc., "Data Ontap 7.2 Commands: Manual Page Reference, vol. 1," May 16, 2008, 615 Pages.
Network Appliance, Inc., "Flexvol and Flexclone Software," 2006, 2 Pages.
Network Appliance, Inc., "NetApp Data Management for Decision Support Systems," 2005-2010, 4 Pages.
Network Appliance, Inc., "Network Appliance Snapmirror Software," 2006, 2 Pages.
Network Appliance, Inc., "SnapManager 2.2 for Oracle Installation and Administration Guide," Nov. 2007, 310 Pages.
Network Appliance, Inc., "SnapManager 3.0 for Oracle Installation and Administration Guide," Nov. 2008, 294 Pages.
Network Appliance, Inc., "SnapManager 5.0 for Microsoft SQL Server Installation and Administration Guide," Oct. 2008, 492 Pages.
Notice of Grounds for Rejection for Japanese Patent Application No. P2014-155597, Apr. 21, 2015, 5 Pages.
Office Action for Australian Patent Application No. AU 2010310827, dated Mar. 20, 2014, 3 Pages.
Office Action for Australian Patent Application No. AU 2010310828, dated Mar. 17, 2014, 3 Pages.
Office Action for Australian Patent Application No. AU 2011278970, dated Nov. 7, 2013, 3 Pages.
Office Action for Australian Patent Application No. AU 2015203259, dated May 4, 2016, 4 Pages.
Office Action for Canadian Patent Application No. CA 2,778,415, dated Nov. 12, 2015, 3 Pages.
Office Action for Canadian Patent Application No. CA 2,804,372, dated Apr. 11, 2016, 3 Pages.
Office Action for Canadian Patent Application No. CA 2,804,372, dated Oct. 14, 2016, 3 Pages.
Office Action for Chinese Patent Application No. CN 201180043780. 2, dated Apr. 3, 2014, 8 Pages. English Translation is not readily available.
Office Action for Japanese Patent Application No. P2012-535259, dated Nov. 26, 2013, 8 Pages.
Office Action for Korean Patent Application No. KR 10-2012-7012816, dated Nov. 25, 2015, 7 Pages.
Office Action for U.S. Appl. No. 12/647,337, dated Jun. 10, 2014, 10 Pages.
Office Action for U.S. Appl. No. 12/647,337, dated Jun. 20, 2013, 10 Pages.
Office Action for U.S. Appl. No. 12/647,337, dated Nov. 26, 2012, 14 Pages.
Office Action for U.S. Appl. No. 13/183,131, dated Oct. 26, 2012, 13 Pages.
Office Action for U.S. Appl. No. 13/301,448, dated Dec. 20, 2012, 24 Pages.
Office Action for U.S. Appl. No. 13/316,263, dated Jan. 14, 2013, 7 Pages.
Office Action for U.S. Appl. No. 13/329,132, dated Apr. 14, 2014, 9 Pages.
Office Action for U.S. Appl. No. 13/329,132, dated Oct. 22, 2013, 10 Pages.
Office Action for U.S. Appl. No. 13/894,259, dated Mar. 24, 2014, 22 Pages.
Oracle, "Oracle Database Backup and Recovery User's Guide," 11g Release 1(11.1), Aug. 2008, 598 Pages.
Osuna, A., "An Introduction to FlexClone Volumes" Redbooks, IBM, 2006, 50 Pages.
Osuna, A., "Data Protection Strategies in IBM System Storage N Series" Redbooks, IBM, Jun. 2008, 90 Pages.
Osuna, A., "IBM System Storage N Series SnapMirror" Redbooks, IBM, Jul. 2006, 124 Pages.
Osuna, A., "IBM System Storage N Series SnapVault Best Practices Guide" Redbooks, IBM, 2007, 54 Pages.
Osuna, A., "Using IBM DB2 UDB with IBM System Storage N series" Redbooks, IBM, Dec. 2006, 136 Pages.
Pan, A. et al, "A Virtual Database Management System for the Internet", 2002, 10 Pages.
Patel, D., et al., "Rapid Database Development and Deployment," NetApp White Paper, Mar. 2007, 11 Pages.
Patterson, H., et al., "SnapMirror: File System Based Asynchronous Mirroring for Disaster Recovery," USENIX Association, Proceedings of the Fast 2002 Conference on File and Storage Technologies, Jan. 28-30, 2002, 14 Pages.
PCT International Search Report and Written Opinion, PCT/US2010/052960, dated Dec. 10, 2010, 17 Pages.
PCT International Search Report and Written Opinion, PCT/US2010/052963, dated Dec. 10, 2010, 16 Pages.
PCT International Search Report and Written Opinion, PCT/US2010/060536, dated Feb. 28, 2011, 12 Pages.
PCT International Search Report and Written Opinion, PCT/US2011/044209, dated Dec. 6, 2011, 10 Pages.
Petition for Inter Partes Review of U.S. Pat. No. 8,150,808, dated Oct. 3, 2014, 61 Pages.
Petition for Inter Partes Review of U.S. Pat. No. 8,150,808, dated Oct. 3, 2014, 65 Pages.
Petition for Inter Partes Review of U.S. Pat. No. 8,150,808, dated Oct. 7, 2014, 65 Pages.
Petition for Inter Partes Review of U.S. Pat. No. 8,161,077, dated Oct. 6, 2014, 62 Pages.
Petition for Inter Partes Review of U.S. Pat. No. 8,161,077, Oct. 6, 2014, 65 Pages.
Petition for Inter Partes Review of U.S. Pat. No. 8,468,174, Oct. 23, 2014, 64 Pages.
Petition for Inter Partes Review of U.S. Pat. No. 8,548,944, Oct. 8, 2014, 65 Pages.
Petition for Inter Partes Review of U.S. Pat. No. 8,548,944, Oct. 8, 2014, 66 Pages.
Petition for Inter Partes Review of U.S. Pat. No. 8,566,361, Oct. 21, 2014, 66 Pages.
Prasad, Sts., et al., "Virtual Database Technology, XML, and the Evolution of the Web", IEEE Computer Society Technical Committee on Data Engineering, 1998, pp. 1-5.
Rajaraman, A., et al., "Virtual Database Technology: Transforming the Internet into a Database", IEEE Internet Computing, Jul./Aug. 1998, pp. 55-58.
Ranganathan, A., and Neto, A., "Technical Report, SnapManager 3.0 for Oracle Best Practices, TR-3761" Apr. 2009, 88 Pages.
Sadagopan, P., et al., "Oracle Fusion Middleware DR Solution Using NetApp Storage," NetApp Technical Report, May 2008, 38 Pages.
Sadagopan, S., "Introduction to WebSphere Federation Server", IBM Data Management Solutions, 2005, pp. 1-45.
Schuettinger, S., "Helping DBAs Become More Efficient NetApp Efficiency and Manageability Advantages," NetApp White Paper, Jul. 2009, 12 Pages.
Schuettinger, S., "NetApp Technical Report—Rapid Deployment of Oracle Database 11g Using VMWare Infrastructure and NetApp Flexclone," NetApp, Jan. 2008, 24 Pages.
Sun Microsystems, Inc., "Solaris ZFS Administration Guide," Aug. 2006, 164 Pages.
Sun Microsystems, Inc., "Solaris ZFS Administration Guide," Mar. 2009, 292 Pages.
Sun Microsystems, Inc., "System Administration Guide: Virtualization Using the Solaris Operating System," Oct. 2009, 562 Pages.
Sun Microsystems, Inc., "ZFS The File System of the Future," Apr. 27, 2009, 19 Pages.
Supplementary European Search Report for European Patent Application No. EP 10825452, dated Jun. 28, 2013, 8 Pages.
Supplementary European Search Report for European Patent Application No. EP 10825453, dated Jun. 28, 2013, 8 Pages.
Supplementary European Search Report for European Patent Application No. EP 11807578.7, dated Sep. 10, 2014, 8 Pages.

(56) References Cited

OTHER PUBLICATIONS

Syncsort Incorporated, "Near-Instant Oracle Cloning with Syncsort AdvancedClient Technologies," Synscort, White Paper, 2007, 12 Pages.
Syncsort Incorporated, "Syncsort Backup Express Advanced Recovery for NetApp," Synscort, 2008, 12 Pages.
Tate, J., et al., "Implementing the IBM System Storage SAN Volume Controller V4.3," IBM Redbook SG24-6423-06, Oct. 2008, 970 Pages.
United States Office Action, U.S. Appl. No. 14/573,761, dated Dec. 31, 2015, 8 pages.
United States Office Action, U.S. Appl. No. 14/573,761, dated May 21, 2015, 9 pages.
"Virtual Databases", Jan. 7, 2008, 4 Pages, [online] [Retrieved on Sep. 19, 2011] Retrieved from the internet <URL:http://www.db2dean.com/Previous|VirtualDB.html>.
VMware, Inc. and EMC Corporation, "Accelerate Oracle Database log Creation and Deployment Using VMware Infrastructure and EMC Celerra Writeable Checkpoints," Mar. 2008, 16 Pages.
VMware, Inc. and IBM "Using IBM.RTM. TotalStorage.RTM. Enterprise Storage Server.RTM. FlashCopy.RTM. Function with the VMware ESX 2.5 Server ("ESX IBM")," Sep. 1, 2005, 25 Pages.
VMware, Inc., "Using Clones to Streamline Development ("Ws5 Clones")," 2005, 9 Pages.
VMware, Inc., "Using VMware Infrastructure for Backup and Restore ("Esx3")," 2006, 20 Pages.
VMware, Inc., "Workstation 5 User's Manual ("WS5 Manual")," 2006, 492 Pages.
Watanabe, S., "Solaris 10 ZFS Essentials," Sun Microsystems, 2010, 146 Pages.
Wikipedia, "ZFS," Last Modified Jul. 22, 2014, 14 Pages.
Wilson, A.J., et al., "Multiple Virtual Databases to Support Multiple VOS in R-GMA", CCLRC-Rutherford Appleton Laboratory, UK, 2006, 3 Pages.
"ZFS Snapshot and Amazon S3 (Part 2 of 2)," Paul'S Blog 3.0 (Release Candidate), Oracle, 2007, 5 Pages.
United States Office Action, U.S. Appl. No. 15/171,331, dated Sep. 22, 2016, nine pages.

\* cited by examiner

| DE/PHIX | Database | Manage Resources | System | Help | | | | Alerts(14) Active Jobs(0) 8 rajendra Log Out |
|---|---|---|---|---|---|---|---|---|
| Policy Management | | | | | ○ ○ Dashboard | | | |
| | | | | | ☐ Default ☐ Template | ☐ Customized ☐ None ✸ | | [Modify Policy Templates] |
| Name | | | SnapSync | ⓘ VDB SnapShot | ⓘ Retention | ⓘ | | VDB Refresh |
| ⊚ R&D | | | ☐ Default | ☐ Default | | | | |
| 🐉 dragon | | | ☐ Default | | | | | |
| ▦ Vdragon-2F6 | | | | ☐ Default | ☐ Default | | | ☐ None |
| ▦ Vdragon-5D9 | | | | ☐ Default | ☐ Default | | | ☐ None |
| ▦ Vdragon-B46 | | | | ☐ None<br>+ Apply New Policy | ☒ | | | ☐ None |
| ▦ Vdragon-BBC | | | | ☐ Default | ☐ Default<br>Daily at<br>Sun 3:30 Am—7:30 AM<br>Mon 3:30 Am—7:30 AM<br>Tue 3:30 Am—7:30 AM<br>Wed 3:30 Am—7:30 AM<br>Thur 3:30 Am—7:30 AM<br>Fri 3:30 Am—7:30 AM<br>Sat 3:30 Am—7:30 AM | | | |
| ⊚ TestGroup | | | ☐ Default | | | | | |

INTERFACING WITH A VIRTUAL DATABASE SYSTEM

CROSS REFERENCES TO RELATED APPLICATIONS

This application is a continuation of U.S. patent application Ser. No. 15/171,331, filed Jun. 2, 2016, which is a continuation of U.S. patent application Ser. No. 14/573,761, filed on Dec. 17, 2014, now issued as U.S. Pat. No. 9,389,962, which is continuation of U.S. patent application Ser. No. 13/894,259, filed on May 14, 2013, now issued as U.S. Pat. No. 8,949,186, which is a continuation of U.S. patent application Ser. No. 13/301,448, filed on Nov. 21, 2011, now issued as U.S. Pat. No. 8,468,174, which claims the benefit of U.S. Provisional Application No. 61/418,396, filed on Nov. 30, 2010, each of which is incorporated by reference in its entirety.

BACKGROUND

This invention relates generally to databases and in particular to interfacing and interacting with storage efficient systems for managing databases.

Databases store the data that is critical to an organization and thus form an important part of an organization's information technology infrastructure. As the information available in an organization grows, so does the complexity of the infrastructure required to manage the databases that store the information. The increased complexity of the infrastructure increases the resources required to manage the databases and the applications that depend on the databases. These increased costs may include the costs associated with hardware for managing the databases as well as the costs associated with additional personnel needed to maintain the hardware. The increased complexity of the infrastructure also affects the maintenance operations associated with the databases, for example, causing backup and recovery operations to take significantly longer.

In a typical organization's infrastructure environment, production database servers run applications that manage the day-to-day transactions of the organization. Changes to production databases or to applications that depend on the production databases are tested on copies of the databases to protect the production environment. Copies of the production databases may be required for several stages in the lifecycles of workflows associated with the production database and applications that depend on the production databases. For example, the stages in the lifecycle of a change incorporated in a production database may include a development stage, a tuning stage, a testing stage, a quality assurance stage, a certification stage, a training stage, and a staging stage. Making copies of the production databases for each stage requires redundant and expensive hardware infrastructure as well as the time overhead required to copy the data, which may take days or weeks. Additional hardware also requires additional costs associated with physically storing the hardware, such as floor space requirements and costs related to power and cooling. Furthermore, redundant hardware typically causes inefficient use of available resources.

Since databases involve complex manipulations of data and information, database products provide various mechanisms to allow users or database administrators to interact or interface with the database. For example, users and database administrators can interact with the database using a user interface, application programming interface, commands, scripts and the like. The mechanisms provided by databases for interfacing with the database can be complex since a large number of commands and options for commands are typically available for manipulating information in a database.

BRIEF DESCRIPTION OF THE DRAWINGS

FIG. 10 shows the user interface for specifying various policies associated with entities associated with the database storage system 100, in accordance with an embodiment of the invention.

Figure 1:
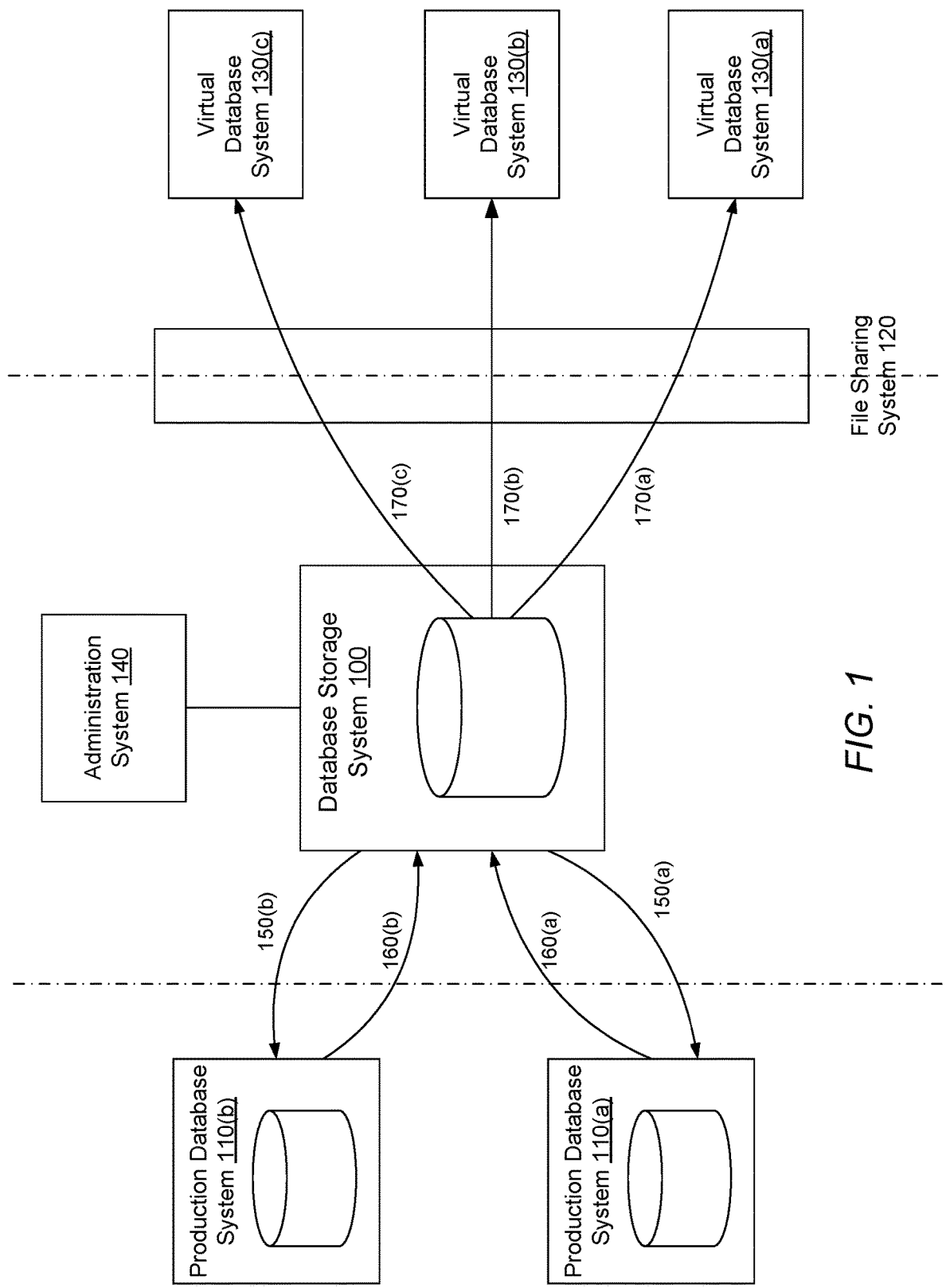
FIG. 1 is diagram illustrating how information is copied from a production database to a database storage system and provisioned as virtual databases using a file sharing system, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Virtual Database Systems

In certain embodiments of the invention, one or more virtual databases are created based on the state of a production database or a virtual database at a particular point in time, and the virtual databases can then be individually accessed and modified as desired. A database comprises data stored in a computer for use by computer implemented applications. A database server is a computer program that can interact with the database and provides database services, for example, access to the data stored in the database. The virtual database provides efficient storage of database blocks by efficiently sharing database blocks between virtual databases. A database block is a unit of data used by a database and comprises a specific number of bytes stored in the storage. A database block can also be referred to as a page. A portion of the database block stores metadata associated with the database block. Examples of information that may be stored in the metadata of a database block include information related to the data stored in the database block, information related to objects of database that the database block is part of, or information indicating when the data in the database block was updated. The information indicating when a database block was updated may be available as a relative ordering of the database blocks based on their time of update.

A database storage system interfaces with a user to receive information necessary for creating a virtual database. The database storage system uses default values as attributes of the virtual database being created to reduce the burden on the database administrator creating the virtual database. However, the database administrator can chose to specify more or less information in order to customize the virtual database being created to suit a particular application or purpose.

Database servers include commercially available programs, for example, database servers included with database management systems provided by ORACLE, SYBASE, MICROSOFT SQL SERVER, IBM's DB2, MYSQL, and the like. The term "production database" is used in particular examples to illustrate a useful application of the technology; however, it can be appreciated that the techniques disclosed can be used for any database, regardless of whether the database is used as a production database. The virtual databases are "virtual" in the sense that the physical implementation of the database files is decoupled from the logical use of the database files by a database server.

In one embodiment, information from the production database is copied to a storage system at various times, such as periodically. The schedule for copying the information from the production database can be either a default schedule selected by the system or specified by the database administrator. This enables reconstruction of the database files associated with the production database for these different points in time. The information may be managed in the storage system in an efficient manner so that copies of information are made only if necessary. For example, if a portion of the database is unchanged from a version that was previously copied, that unchanged portion need not be copied. A virtual database created for a point in time is stored as a set of files that contain the information of the database as available at that point in time. Each file includes a set of database blocks and the data structures for referring to the database blocks. In some embodiments, the database blocks may be compressed in order to store them efficiently.

A virtual database may be created on a database server by creating the database files for the production database corresponding to the state of the production database at a previous point in time, as required for the database server. The files corresponding to the virtual database are made available to the database server using a file sharing mechanism, which links the virtual database to the appropriate database blocks stored on the storage system. The process of making the virtual database available to a database server is called "provisioning" the virtual database. In some embodiments, provisioning the virtual database includes managing the process of creating a running database server based on virtual database. Multiple VDBs can be provisioned based on the state of the production database at the same point in time. On the other hand, different VDBs can be based on different point in time state of the same production database or different production databases.

The database server on which a virtual database has been provisioned can then read from and write to the files stored on the storage system. A database block may be shared between different files, each file associated with a different VDB. In particular, a database block is shared if the corresponding virtual database systems 130 are only reading the information in the database block and not writing to the database block. In one embodiment, the virtual database manager makes copies of the database blocks only if necessary. For example, a particular database block may be shared by multiple VDBs that read from the same database block. But if one of virtual database systems attempts to write to the database block, a separate copy of the database block is made because the writing operation causes that database block to be different for the VDB corresponding to that virtual database systems than it is for the other VDBs. Systems and methods for creating and using virtual databases are disclosed in U.S. patent application Ser. No. 12/603,541 filed on Oct. 21, 2009, which is incorporated by reference in its entirety.

System Environment

FIG. 1 illustrates one embodiment for how information may be copied from a production database to a database storage system and provisioned as virtual databases using a file sharing system. The production database systems 110 manage data for an organization. In some embodiments information may be copied from storage level snapshots of production databases or clones of production databases instead of a live production database. The database storage system 100 retrieves data associated with databases from one or more production database systems 110 and stores the data in an efficient manner, further described below. A database administrator user interface 140 allows a database administrator to perform various actions supported by the database storage system 100.

In response to a request from the administrator system 140, or based on a predefined schedule, the database storage system 100 may send a request 150 for data to a production database system 110. The production database system 110 responds by sending information stored in the production database as a stream of data 160. The request 150 is sent periodically and the production database system 110 responds by sending information representing changes of data stored in the production database since the last response 160 sent by the production database system 110. The database storage system 100 receives the data 160 sent by the production database system 110 and stores the data. The database storage system 100 may analyze the data 160 received to determine whether to store the information or skip the information if the information is not useful for reconstructing the database at previous time points. The database storage system 100 stores the information efficiently, for example, by keeping versions of database blocks that have changed and reusing database blocks that have not changed. In an embodiment, database storage system 100 employs a hierarchical caching system where high speed solid-state drive (SSD) or equivalent storage devices are configured for caching read operations and for persisting logs for writing operations to magnetic disks.

To create a virtual database, the database storage system 100 creates files that represent the information corresponding to the production database system 110 at a given point in time. The database storage system 100 exposes 170 the corresponding files to a virtual database system 130 using a file sharing system 120. The virtual database system 130 runs a database server that can operate with the files exposed 170 by the database storage system 100. Hence, a virtual copy of the production database is created for the virtual database system 130 for a given point in time in a storage efficient manner.

System Architecture

Figure 2:
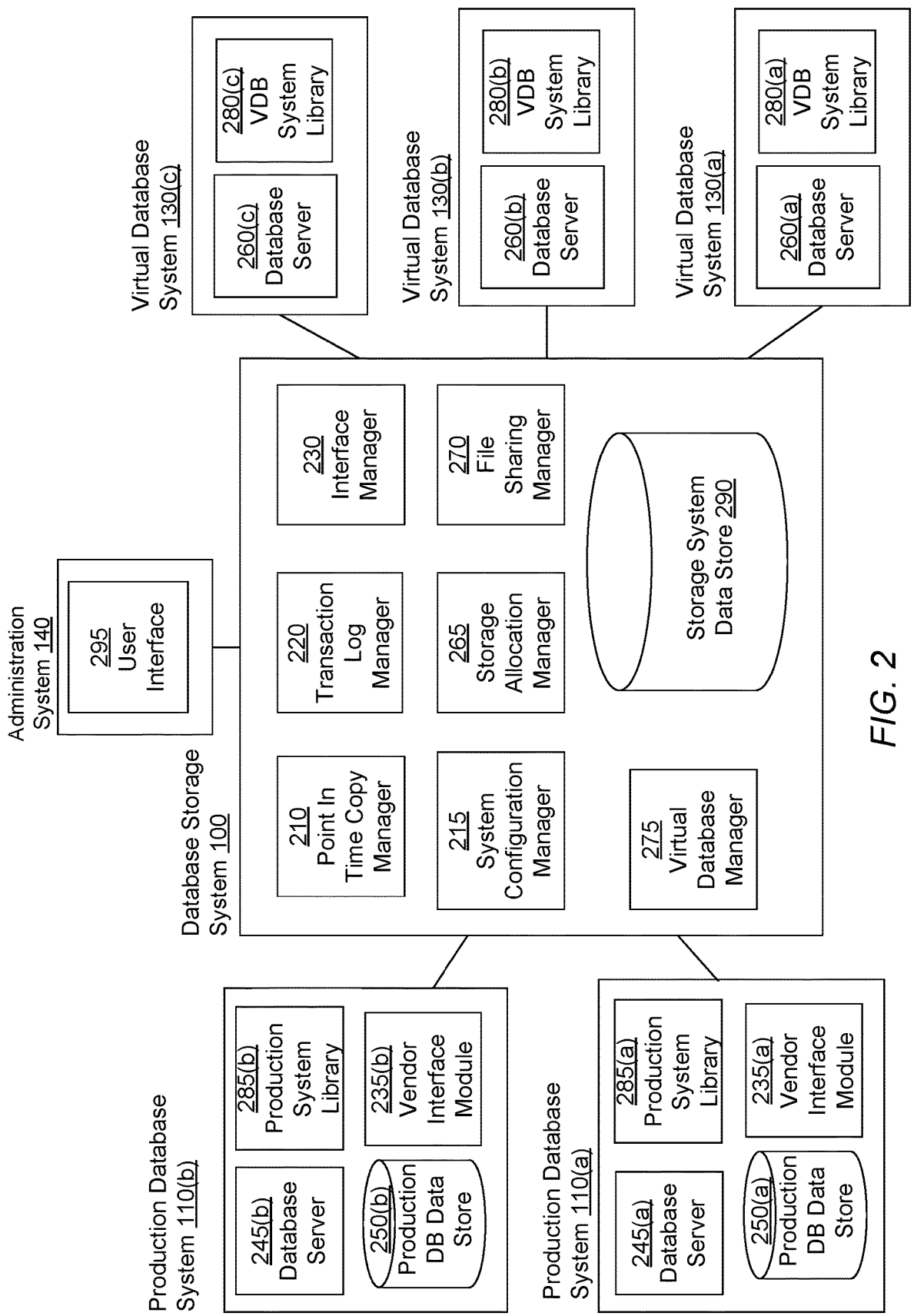
FIG. 2 is a schematic diagram of the architecture of a system that makes storage efficient copies of information from a production database and provisions virtual databases, in accordance with an embodiment of the invention.

FIG. 2 shows a high level block diagram illustrating a system environment suitable for making storage efficient copies of information from a production database and provisioning one or more virtual databases using that information. The system environment comprises one or more production database systems 110, a database storage system 100, an administration system 140, and one or more virtual database systems 130. Systems shown in FIG. 2 can communicate with each other if necessary via a network.

A production database system 110 is typically used by an organization for maintaining its daily transactions. For example, an online bookstore may save all the ongoing transactions related to book purchases, book returns, or inventory control in a production system 110. The production system 110 includes a database server 245, a production DB data store 250, a vendor interface module 235, and a production system library 285. In alternative configurations, different and/or additional modules can be included in a production database system 110.

The production DB data store 250 stores data associated with a database that may represent for example, information representing daily transactions of an enterprise. The database server 245 is a computer program that provides database services and application programming interfaces (APIs) for managing data stored on the production DB data store 250. The production system library 285 provides APIs useful for extracting information from the production database system 110. The vendor interface module 235 represents APIs provided by a vendor for customizing functionality provided by the database server 245, for example, APIs to retrieve database blocks that changed since a previous time point. An example of a vendor interface module is the program code of a database server provided by vendor ORACLE that implements RMAN APIs. Database servers provided by other vendors, for example, MICROSOFT's SQL SERVER or IBM's DB2 have similar APIs. In one embodiment, the vendor interface module 235 mounts the production DB data store 250 of the production database system 110 on the database storage system 100 using a file sharing system similar to the file sharing system 120. Mounting the production DB data store 250 on the database storage system 100 allows transfer of information stored on the production database system 110 to the database storage system 100.

The production system library 285 may be implemented in different ways depending on the requirements of the vendor interface module 235. In an embodiment, the vendor interface module 235 loads the production system library 285 in order to call back functions implemented in the production system library 285. For example, the production system library 285 may be a shared object file with a ".so" or a ".DLL" file extension that contains executable program code that can be called by a C/C++ executable program or by a JAVA program that uses the JAVA NATIVE INTERFACE for interaction with binary code generated by C/C++ programs. Alternatively, the production system library 285 may be implemented using the JAVA programming language and installed in the production database system 110 as a file with ".jar" extension. The java program requires a JAVA VIRTUAL MACHINE running on the production database system 110 for execution. In another embodiment, a part of the production system library 285 may be implemented as an executable ".so" shared object file and another part of the production system library 285 may be implemented as a JAVA program installed as a ".jar" file.

The vendor interface module 235 responds to requests from database storage system 100, and in response to the requests, collects requested information from the production DB data store 250 and returns the collected information to the database storage system 100. The vendor interface module 235 may send request to the database server 245 for retrieving information from the production DB data store 250. The vendor interface module 235 loads the program code in the production system library 285 and invokes it to transmit the stream of data for to the database storage system 100 for further processing. In some embodiments the vendor interface module 235 may directly interact with the production DB data store 250 instead of sending a request to the database server 245 to retrieve the necessary database blocks. In other embodiments, the vendor interface module 235 may retrieve the necessary database blocks from storage level snapshots of production databases or clones of production databases instead of a live production database.

The database storage system 100 retrieves information available in the production database systems 110 and stores it. The information retrieved includes database blocks comprising data stored in the database, transaction log information, metadata information related to the database, information related to users of the database and the like. The information retrieved may also include configuration files associated with the databases. For example, databases may use vendor specific configuration files to specify various configuration parameters including initialization parameters associated with the databases. Copying the configuration files allows a VDB to be created with configuration parameters similar to the source production database. In some embodiments, the configuration parameters files may be modified by a database administrator using the user interface 295 to customize the VDB configuration for a specific usage scenario. For example, the production database may be accessed by a database server 245 using a particular cache size whereas the corresponding VDB may be accessed by a database server 260 using a different cache size.

The information retrieved may also include information associated with applications using the database, for example, an enterprise resource planning (ERP) application may be using the database and may have data specific to the ERP application. Retrieving the ERP application data allows a similar ERP application to be executed with a VDB created based on the production database system. This is beneficial for usage scenarios where a VDB is created for an environment similar to the production environment, for example, for testing and development. A database administrator can use the user interface 295 to specify logic for copying the information that is specific to a production environment as well as logic for appropriately installing the information with a VDB for use by a virtual database system 130.

In some embodiments, information regarding users of the production database, for example, the users with administrative privileges may be obtained by using specific APIs or by running specific scripts on the production database. The information about the users can be used to facilitate life cycle management of VDBs in the system. In an embodiment, a database administrator is allowed to use the user interface 295 in order to specify information regarding user accounts to be created and their access permissions. For example, if the VDB is created for testing purposes, test users may be created on the VDB for test organization whereas if the VDB is created as a standby for the production database, only users with production support roles should have access. In some embodiments, access permission may specify if a user can provision a privileged VDB. One example of privileged VDB is a VDB with full access to non-public information (information that may not be accessible to non-privileged users), for example, social security numbers or credit card information. The corresponding un-privileged VDB is a VDB with non-public information masked or scrambled. Another example of privileged VDB is a VDB with sensitive data accessible transparently. The corresponding un-privileged VDB is a VDB with sensitive information encrypted.

In some embodiments, access privileges are simplified to three levels: administrator, owner, and auditor. Administrator has full control of all managed objects including databases and hosts. The control available to an administrator included policy management. Owner has access to use of resources, for example, an owner can provision a VDB. Auditor can view logs but may not have rights to consume system resources.

The data stored in the storage system data store 290 can be exposed to a virtual database system 130 allowing the virtual database system 130 to treat the data as a copy of the production database stored in the production database system 110. The database storage system 100 includes a point-in-time copy manager 210, a transaction log manager 220, a interface manager 230, a system configuration manager 215, a storage allocation manager 265, a file sharing manager 270, a virtual database manager 275, and a storage system data store 290. In alternative configurations, different and/or additional modules can be included in the database storage system 100.

The point-in-time copy manager 210 interacts with the production database system 110 by sending a request to the vendor interface module 235 to retrieve information representing a point-in-time copy (also referred to as a "PIT copy") of a database stored in the production DB data store 250. The point-in-time copy manager 210 stores the data obtained from the production database system 110 in the storage system data store 290. The data retrieved by the point-in-time copy manager 210 corresponds to database blocks (or pages) of the database being copied from the production DB data store 250. After a first PIT copy request to retrieve information production DB data store 250, a subsequent PIT copy request may need to retrieve only the data that changed in the database since the previous request. The data collected in the first request can be combined with the data collected in a second request to reconstruct a copy of the database corresponding to a point in time at which the data was retrieved from the production DB data store 250 for the second request.

The transaction log manager 220 sends request to the production database system 110 for retrieving portions of the transaction logs stored in the production database system 110. In some embodiments, the request from the transaction log manager 220 is sent to the vendor interface module 235. The data obtained by the transaction log manager 220 from the vendor interface module 235 is stored in the storage system data store 290. In one embodiment, a request for transaction logs retrieves only the changes in the transaction logs in the production database system 110 since a previous request for the transaction logs was processed. The database blocks retrieved by a point in time copy manager 210 combined with the transaction logs retrieved by the transaction log manager 220 can be used to reconstruct a copy of a database in the production system 110 corresponding to times in the past in between the times as which point-in-time copies are made.

The storage allocation manager 265 provides the functionality of saving data retrieved from the production database system 110. For example, the point-in-time copy manager 210 may call APIs of storage allocation manager to save blocks of data retrieved from the production database system 110. The storage allocation manager 265 keeps track of the various versions of each block of data that may be obtained from the production database system 110. For a given time point, the storage allocation manager 265 can be requested to provide the latest version of a block of data obtained before the given time point. The storage allocation manager 265 can also be used for making copies of blocks of data. If a block of data is copied for read-only purposes, the storage allocation manager 265 allocates only sufficient storage to keep a pointer of reference to the exiting block of data. However, if an attempt to write to the copied block of data is made, the storage allocation manager 265 allocates sufficient storage to make an actual copy of the block of data to avoid updating the original block of data.

The file sharing manager 270 allows files stored in the storage system data store 290 to be shared across computers that may be connected with the database storage system 100 over the network. The file sharing manager 270 uses the file sharing system 120 for sharing files. An example of a system for sharing files is a network file system (NFS). A system for sharing files may utilize fiber channel Storage area networks (FC-SAN) or network attached storage (NAS) or combinations and variations thereof. The system for sharing files may be based on small computer system interface (SCSI) protocol, internet small computer system interface (iSCSI) protocol, fiber channel protocols or other similar and related protocols. In some embodiments, the database storage system 100 may utilize a logical volume manager. Sharing a file stored in the storage system data store 290 using the file sharing manager 270 allows a remote computer, for example, the virtual database systems 130 to access the data in the shared file. A remote system may be able to read and write from/to the file shared by the storage system data store 290. In an embodiment, files are organized in a format emulating a given file system disk layout, such as the file system of WINDOWS operating system called NTFS or the UNIX file system (UFS).

The virtual database manager 275 receives requests for creation of a virtual database for a virtual database system 130. The request for creation of a virtual database may be sent by a database administrator using the administration system 140 and identifies a production database system 110, a virtual database system 130, and includes a past point-in-time corresponding to which a virtual database needs to be created. The virtual database manager 275 creates the necessary files corresponding to the virtual database being created and shares the files with the virtual database system 130. The database administrator for a virtual database system 130 may be different from a database administrator for the production database system 110.

The interface manager 230 renders for display information necessary for display using the administration system 140. A database administrator user can see information available in the storage system data store 290 as well as take actions executed by the database storage system. For example, a database administrator can see the different production databases stored in the storage system data store 290 obtained from different production database systems 110. As another example, the database administrator can request the database storage system 100 to make a PIT copy of a database stored on a production database system 110 at a particular point-in-time. In an embodiment, the interface manager 230 allows external applications to access information of the database storage system 100. For example, the database storage system may provide application programming interface (API) to allow third party vendors to write applications based on database storage system 100. In an embodiment, the interface manager 230 provides web services that allow web applications to access information available in the database storage system 100. For example, the database storage system can be part of a cloud computing environment. A third party vendor can use web services to implement various workflow scenarios based on VDBs, for example the various workflow scenarios described herein. This allows automation of the workflow scenarios based on VDBs.

The system configuration manager 215 allows a database administrator using the administration system 140 to setup or change the configuration of the database storage system 100. For example, when the database storage system is being initially setup or at a later stage, the system configuration manager 215 allows a database administrator user or an agent to specify production database systems 110 and virtual database systems 130 to connect to. The system configuration manager 215 also allows a user with appropriate roles and privileges to setup policies specifying the schedule with which the point-in-time copy manager 210 retrieves PIT copies of databases in the production database systems 110 as well as the frequency and the times at which the transaction log manager 220 retrieves updates to online transaction logs from the production database systems 110. In an embodiment, a schedule can specify the frequency and times during the day for the PIT and log retrieval actions or it could be an periodic schedule specifying the calendar days when the same action should take place.

In an embodiment, policies can be defined by a database administrator and stored in the system configuration manager 215 for various operations associated with the loading of point-in-time copies from production database systems 110, loading of transaction logs from the production database systems 110, purging of information from the database storage system 100 including point-in-time copies of databases and transaction log information, and provisioning of virtual database systems. A policy specifies rules for executing the specific operation. For example, a policy may specify the operation to be executed based on a predetermined schedule. A policy may determine when to purge PIT copies stored in the database storage system 100 based on number of PIT copies that have been accumulated for a production database. A policy may measure storage availability to determine when to purge information. For example, if the amount of storage available reaches below a threshold level, old PIT copies of selected databases may be purged. The policy may also specify priority of production databases to be used before purging information, for example, low priority database information is purged before purging high-priority database information. In a particular workflow scenario, a policy may determine when to obtain new information from a production database and automatically update VDB information and provision the updated VDB based on the new information.

A virtual database system 130 includes a database server 260 and a VDB system library 280. The database server 260 is similar in functionality to the database server 245 and is a computer program that provides database services and application programming interfaces (APIs) for managing data stored on a data store 250. The data managed by the database server 260 may be stored on the storage system data store 290 that is shared by the database storage system 100 using a file sharing system 120. The VDB system library 280 contains program code for processing requests sent by the database storage system 100. In alternative configurations, different and/or additional modules can be included in a virtual database system 130.

Figure 3:
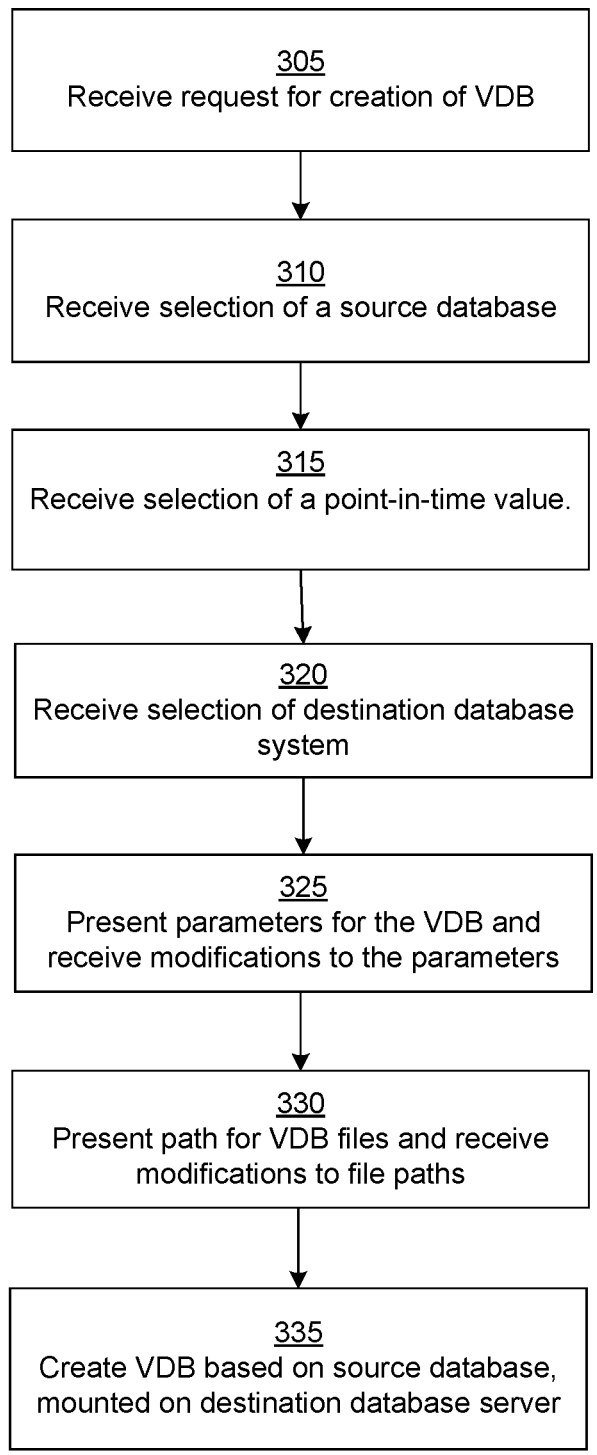
FIG. 3 shows a process illustrating the steps for interacting with a user for creating a VDB, in accordance with an embodiment.

FIG. 3 shows a process illustrating the steps for interacting with a user for creating a VDB, in accordance with an embodiment. The database storage system 100 receives 305 a request for creation of a VDB. In an embodiment, an access to a uniform resource locator (URL) by the user for running an application or starting an application by an alternative mechanism may be considered a request for creation of a VDB. For example, an application that provides the user interface 295 may provide a screen that allows the user to create a VDB upon startup.

The user interface 295 can provide a list of source databases to select from. The user can select a particular source database and send the selection to the database storage system 100. The database storage system 100 receives 310 the selection of the source database. The source databases presented to the user for selection comprise source databases for which the database storage system 100 has stored point-in-time copies and transaction logs. In an embodiment, the user provides input identifying a server machine hosting one or more databases. The database storage system 100 analyzes the server machine to determine the databases hosted by the server machine and presents the discovered databases as potential source databases to select from. The discovery of the databases can be based on discovery of names of files or file paths that are typically used by production database system 110 as well as by discovery of processes running on the server machine that are typically present in production database systems 110.

The user interface 295 allows the user to select a point-in-time value. The database storage system 100 receives 315 the selection of the point-in-time value. In an embodiment, the user interface 295 presents a time line to the user indicating a range of point-in-time values to select from, allowing the user to select a point-in-time value by identifying a position in the time line. The database storage system 100 uses the point-in-time value for determining the database blocks of the source database stored in the storage system data store 290 to be used for creating the VDB.

The user interface 295 allows the user to select a destination database system 130 for accessing the VDB being created. The database storage system 100 receives 320 the selection of the destination database system 130 from the user. In an embodiment, the user interface 295 presents a list of previously selected destination database systems 130 to the user. Alternatively, the user interface 295 allows the user to enter information identifying the destination database systems 130, for example, using a machine name or internet protocol (IP) address.

The user interface 295 presents 325 to the user, the parameters of the source database selected by the user. The database storage system 100 by default may use values from the parameters of the source database as the corresponding parameters for the VDB being created. Alternatively, the user can modify the parameter values presented by the user interface 295. The modifications of the parameters are received 325 by the database storage system 100. The database storage system 100 uses the set of parameters including the unmodified values as well as the modified values as the parameters for the VDB being created. In an embodiment the database storage system 100 stores the set of parameters values as modified by the user and uses them as the default for subsequent VDBs created by the user, for example, VDBs created using the same source database.

The user interface 295 presents 330 to the user, the file paths where the database storage system 100 expects to create the files associated with the VDB. The user can modify the file paths as well as the file names. For example, certain applications using the VDB may require a special file naming convention or the files to be stored at a particular file path. The database storage system 100 received 335 the modifications to the file path. In an embodiment, the user interface 295 allows the user to map patterns in the default file path to patterns associated with a desired file path. The mapping of the patterns can be stored by the database storage system 100 and applied to subsequent VDBs created by the user.

Based on the input received by the database storage system 100 in the steps described above the database storage system 100 creates the VDB. The created VDB is based on a snapshot and transaction logs associated with the point-in-time value selected by the user. The database blocks of the source database associated with updates made in the source database prior to the selected point-in-time are linked to a file structure created for the VDB. The file structure for the VDB is mounted on the destination database system 130, thereby allowing the destination database system to access the VDB.

In an embodiment, the steps illustrated in the FIG. 3 may be performed by a user or by a script or a program. A user interface may be provided to a user for allowing the user to provide input and execute one or more steps shown in FIG. 3. Alternatively, a script may perform the various steps using commands provided by the database storage system 100 or an application may invoke application programming interface (APIs) provided by the database storage system 100 to execute the steps illustrated in FIG. 3. Some of the steps illustrated in the FIG. 3 may be optional and the database storage system 100 may use default values instead of user provided values.

Figure 4:
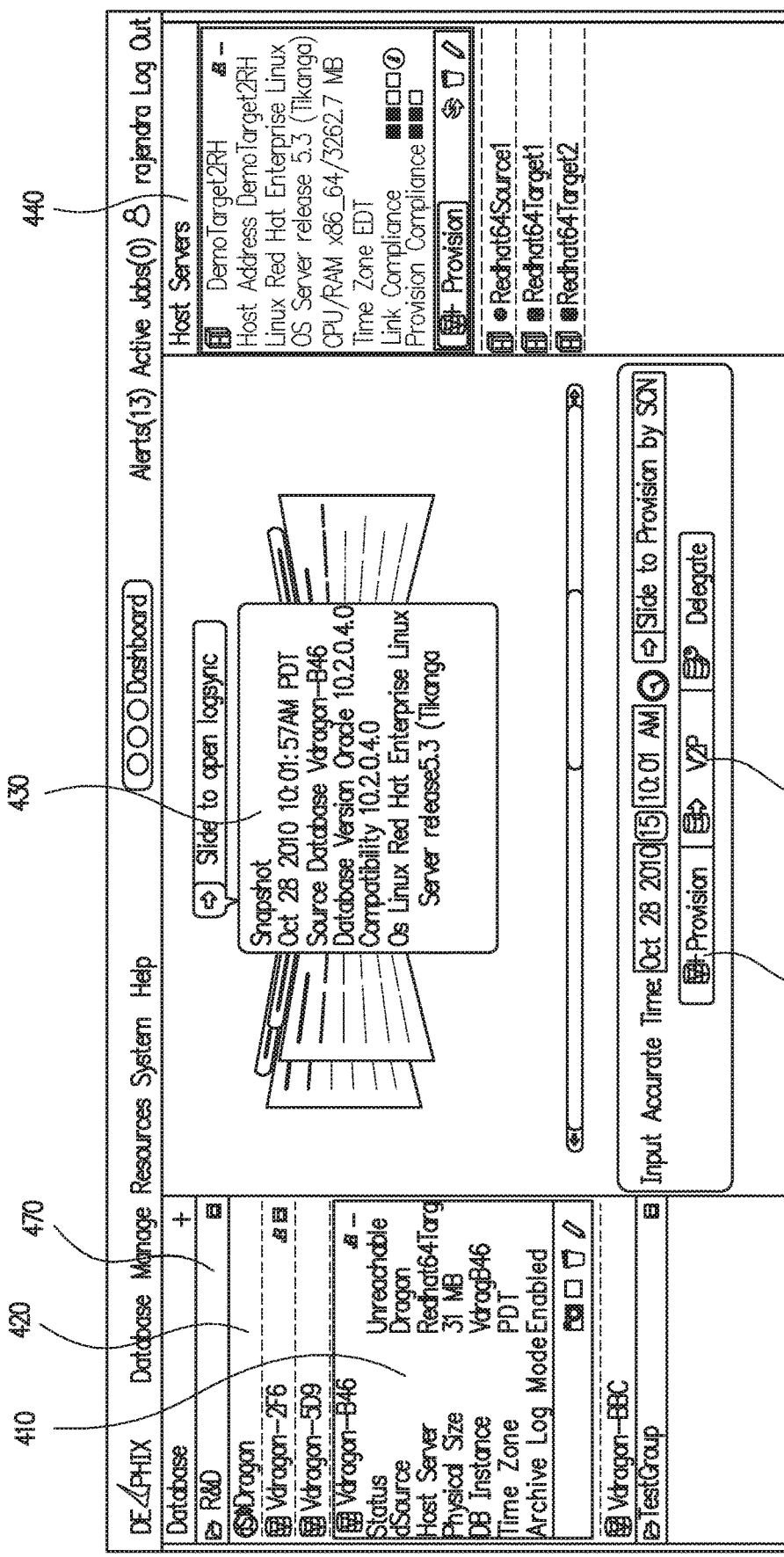
FIG. 4 shows a user interface for allowing a user to select a source database for creating a virtual database, in accordance with an embodiment of the invention.

FIG. 4 shows a user interface for allowing a user to select a source database for creating a virtual database, in accordance with an embodiment of the invention. The user interface shown in FIG. 4 displays production database systems 110 as data sources 420. Each data source may display one or more source databases 410. In an embodiment, a data source may be selected by default, for example, the last used data source 420. A data source 420 corresponds to a server and can be added by the system administrator by specifying information identifying the server, for example, the host name of the server or the internet protocol (IP) address of the server along with authentication information. The authentication information is required so that the database storage system 100 is permitted to sent libraries comprising code for allowing the database storage system 100 to perform various actions on the production database system 110.

In response to the user selecting a particular source database 410, the user interface provides information describing the source database including its status, size, name etc. as well as information describing the various point-in-time copies 430 stored on the database storage system 100. The information describing each point-in-time copy 430 comprises the time at which the point-in-time copy was made, the source database from which the point-in-time copy was made, and information describing the source database as well as the production database system 110 hosting the source database. The source database can be a virtual database associated with the data source.

The user interface shown in FIG. 4 allows the user to provision 450 a new virtual database based on a selected source database or to export a physical copy 460 of the selected source database. For example, if the source database 410 is a virtual database, a physical copy of the database is materialized and stored on a target machine. The user interface shown in FIG. 4 allows a user to select the target machine 440 associated with the virtual database or the physical copy of the database. The target machine 440 can be a virtual database system 130 for accessing the virtual database being created.

The user interface shown in FIG. 4 allows a user to organize the databases created using groups 470. The attributes of all the databases can be controlled as a group. For example, policies can be specified for the entire group including policies defining a schedule for making point-in-time copies of the source database and policies defining retention schedule for point-in-time copies. An attribute specified for the group 470 is applied by the database storage system 100 to all the databases in the group unless the user specifically modifies attributes for a specific database.

Figure 5:
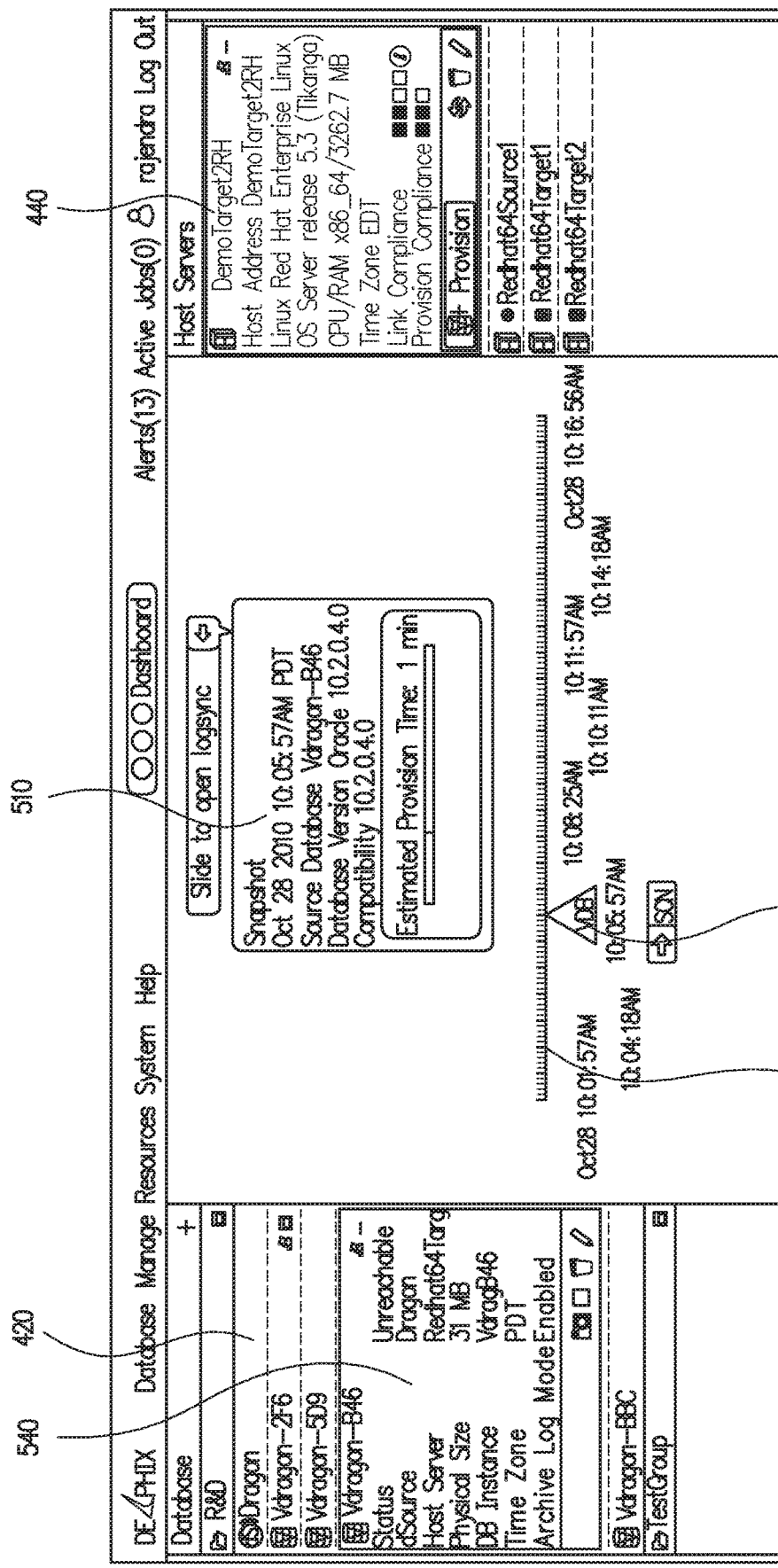
FIG. 5 shows a user interface for allowing a user to select a particular point in time associated with the source database for creating a virtual database based on the selected point in time, in accordance with an embodiment of the invention.

FIG. 5 shows a user interface for allowing a user to select a particular point in time associated with the source database for creating a virtual database based on the selected point in time, in accordance with an embodiment of the invention. The point-in-time copies of the source database can be taken based on a schedule, for example, once a day. However, the transaction log manager 220 copies transaction logs from the source database and stores them on the database storage system 100 thereby allowing a virtual database to be created based on a state of the source database at a time in between the time of copying of two point-in-time copies of the source database. For example, the user selects a point-in-time copy 510 based on a source database 540 for creation of a virtual database. The user can be presented with a user interface 520 for selecting a time point after the time of copying of the point-in-time copy 510 (and before the time of copying of the next point-in-time copy, if available).

The user interface 520 allowing the user to select a time point in between the time of copying of two point-in-time copies can be a time line marked with various time points that can be selected. The user may be provided a slider 530 for allowing the selection of a particular time point on the time line 520. Alternatively, the user interface can provide the user with any geometric shape that can be used for representing various time points, for example, a curved line or a thin rectangle or ellipse. The user can select a particular time point by using a slider 530 or by clicking or double clicking at a particular position in the geometric shape. In an embodiment the user can be presented with a list of various time points based on textual representation, for example, a drop down list and the user can make a particular selection. Another embodiment, allows the user to enter a time value using a data entry widget, for example, text box. The value entered by the user can be validated by the interface manager 230, for example, to ensure that the value is within a valid range.

Figure 6:
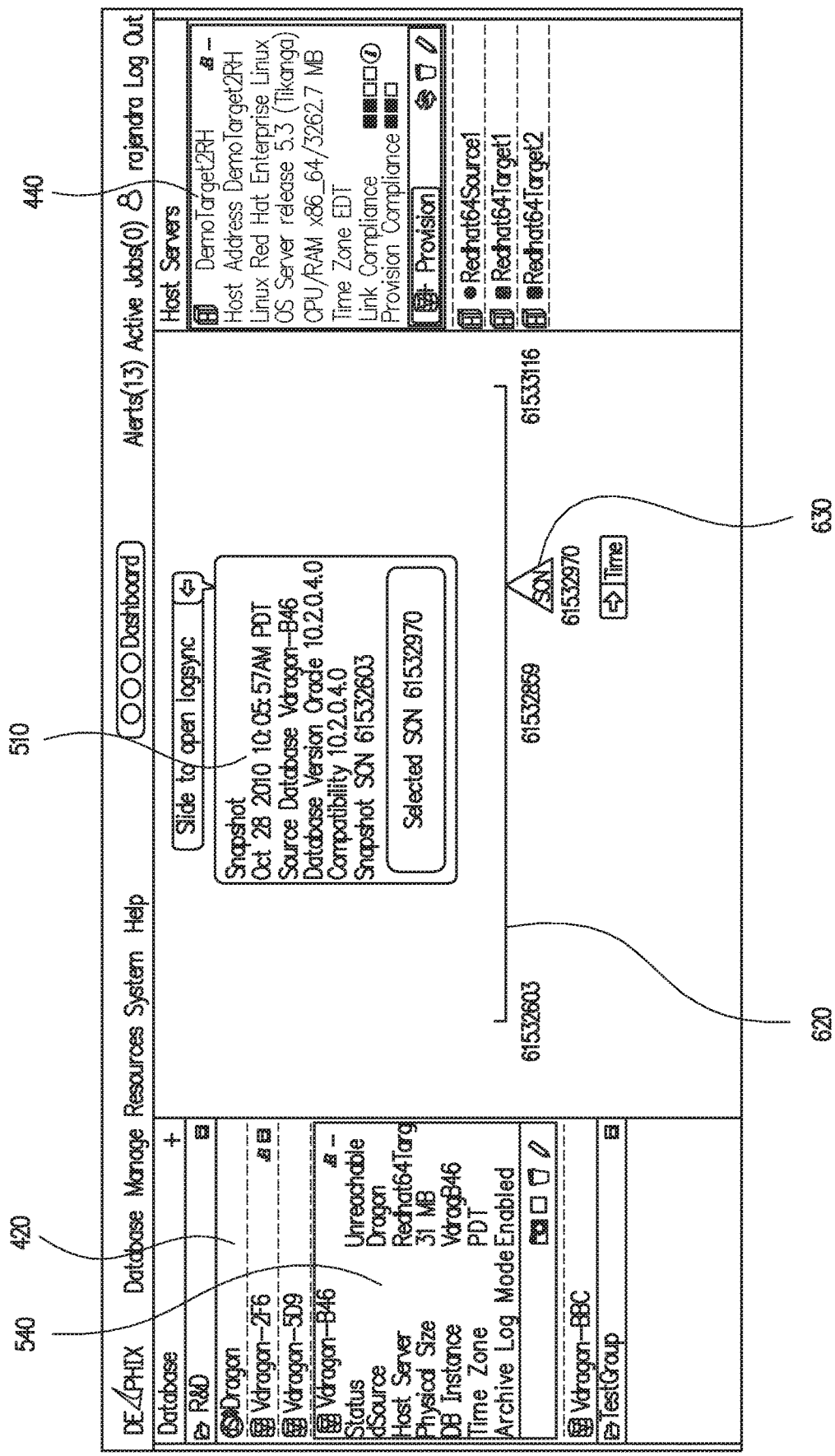
FIG. 6 shows a user interface for allowing a user to select a database action of the source database for creating a virtual database based on the selected action, in accordance with an embodiment of the invention.

FIG. 6 shows a user interface for allowing a user to select a database action of the source database for creating a virtual database based on the selected action, in accordance with an embodiment of the invention. A particular time point associated with a database can be determined in terms of a sequence provided by the database, for example, a system change number. The sequence identifies actions taken by the source database and has a monotonically increasing value. For example, every time a particular type of action is taken by the database, the sequence number is updated (i.e., incremented). Examples of actions causing the sequence number to update include commit operations in the database associated with changes to the database including updates, inserts, deletes etc. The sequence number allows the user to select a particular source database operation for creating a virtual database. The resulting virtual database is based on the state of the source database up to the point in time associated with the selected database operation. The selection of the sequence value can be based on a geometric shape associated with a slider as described for selection of point in time, for example a line 620 such that positions of the line are associated with values of the sequence. A particular position of the line can be selected using a slider 630. Alternatively, the sequence value can be manually entered by a user in a data entry widget or selected from a list, for example, a drop down list.

Figure 7:
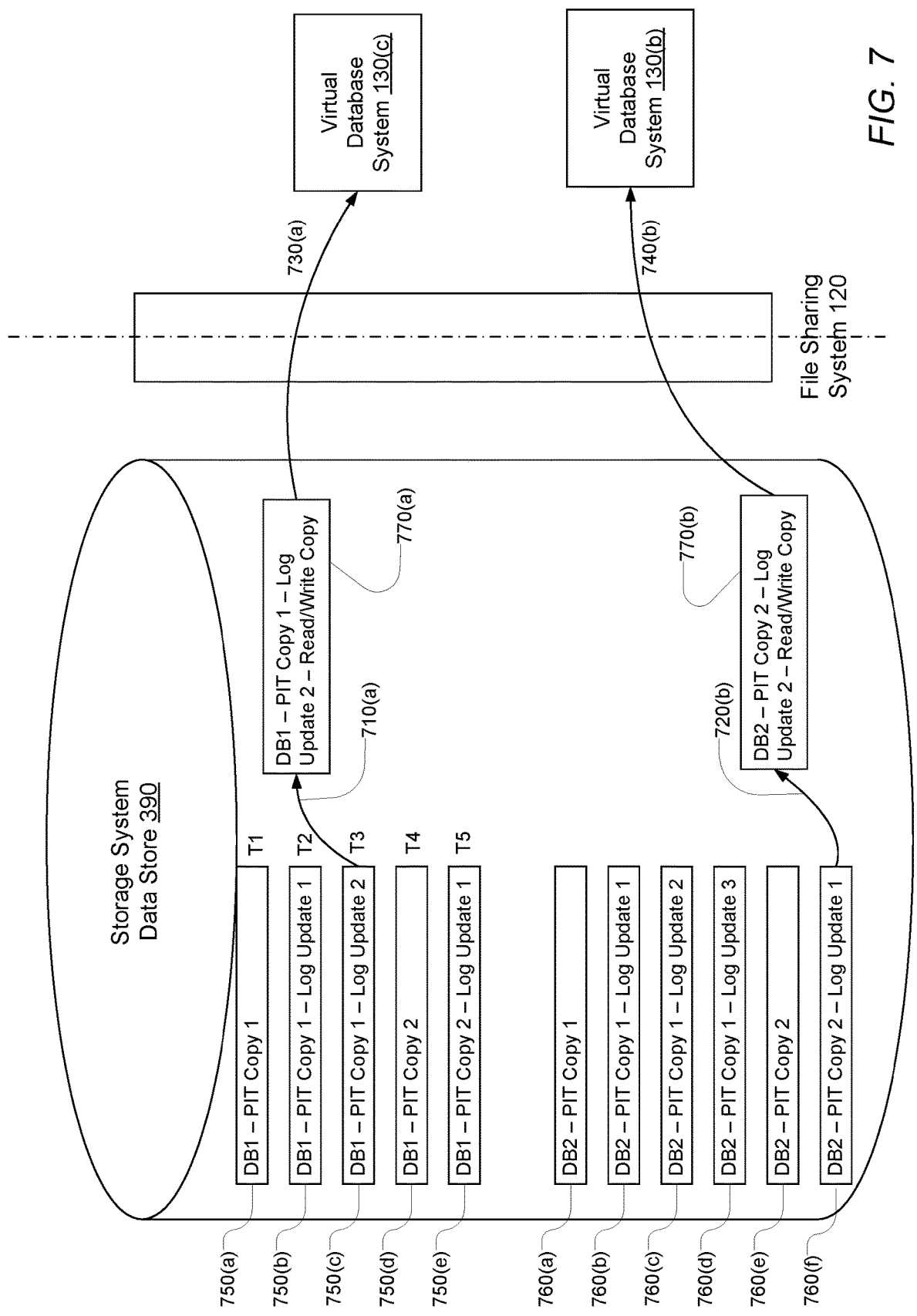
FIG. 7 is a schematic diagram of the architecture of a system that makes storage efficient copies of information from a production database and provisions virtual databases, in accordance with an embodiment of the invention.

FIG. 7 illustrates the information obtained at different points in time by the database storage system 200 from various production database systems 110 that is stored in the storage system data store 290. FIG. 7 shows information related to two databases, DB1 and DB2 obtained from the production database system 110. The information 750 corresponds to data obtained for database DB1 whereas the information 760 correspond to the data obtained for database DB2. The information 750 or 760 comprises a set of database blocks and a set of transaction logs. The information 750(a) represents the first PIT copy of database DB1 obtained from the production database system 110. The information 750(b) represents the first transaction log update for the database DB1 since the first PIT copy and the information 750(c) represents the second transaction log update for the database DB1 since the first PIT copy. The information 750(d) represents second PIT copy of the database DB1. The information 750(d) stores only the database blocks that were changed in the database DB1 since the first PIT copy was made. The information 750(e) represents the first transaction log update for the database DB1 since the second PIT copy. Similarly the information 760 correspond to the database DB2. The time Ti indicated next to a information 750 corresponds to the time that information was copied in the structure. For a PIT Copy (without log updates, for example, 750(a) or 750(d)) made by a PIT copy manager 210, the time Ti represents the time of the last update made to the database blocks before the PIT copy was made. For information corresponding to a log update, for example, 750(b), 750(c), or 750(e), the time Ti represents the time of the last transaction log in the corresponding set of the transactions logs stored.

The arrow 710 shown in FIG. 7 represents the step of creating the files representing a read/write copy of a database based on the information 750 as performed by the virtual database manager 275. The arrows 730 represent the step of making the files 770 available to the virtual database system 130 via the file sharing system 120.

Figure 8B:
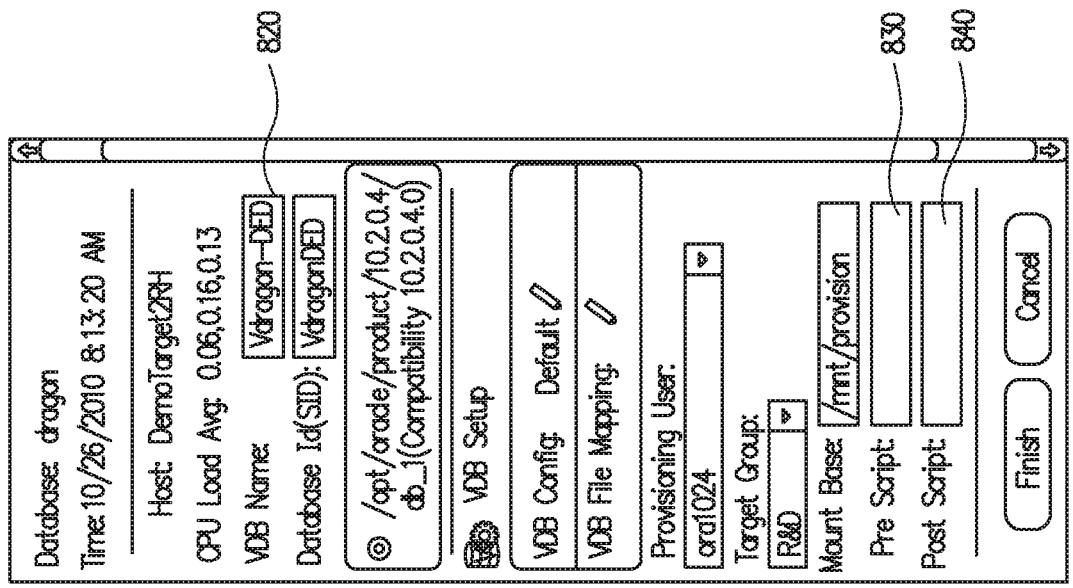
FIG. 8B shows a user interface for allowing the user to specify a database name or identifier value for uniquely identifying the virtual database being created, in accordance with an embodiment of the invention.
Figure 8A:
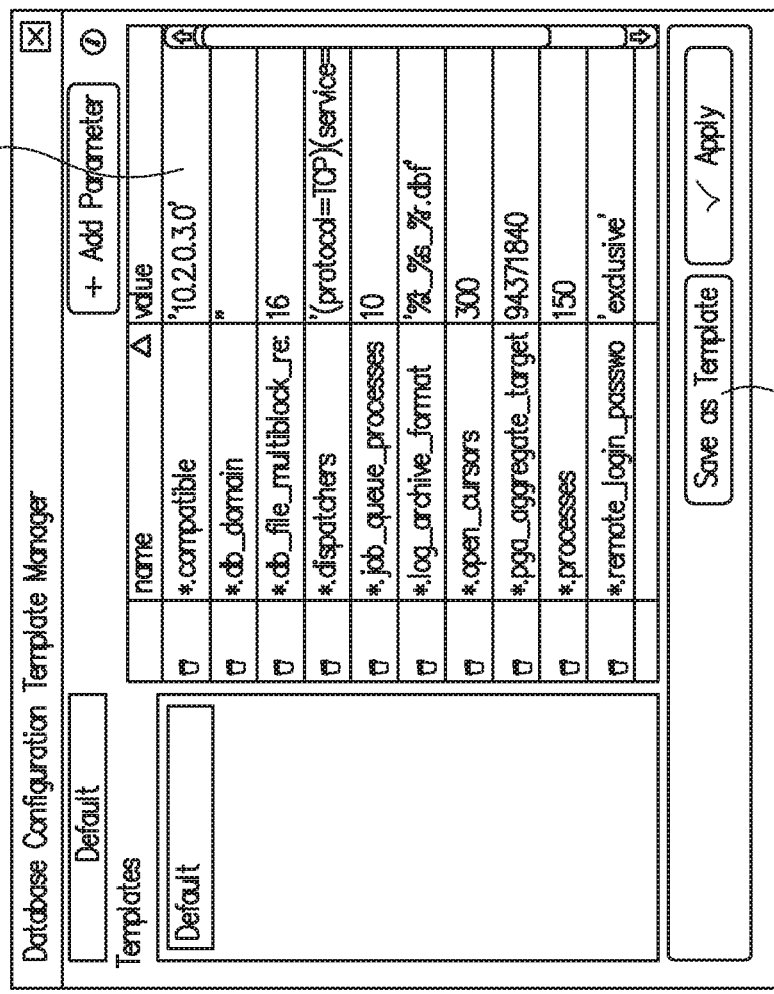
FIG. 8A shows a user interface for allowing a user to change parameters associated with the virtual database being created, in accordance with an embodiment of the invention.

FIG. 8 shows a user interface for allowing a user to change parameters associated with the virtual database being created, in accordance with an embodiment of the invention. The virtual database manager 275 can determine values for the database parameters of the virtual database. These database parameters determine various attributes associated with the virtual database, for example, the block size used, attributes describing runtime structures created by the virtual database, allocation of memory used for various types of data and structures associated with the virtual database, and the like. The database parameters values can be based on previous values specified by the user, the database parameter of the source database, information describing the virtual database system 130 and related information. The user interface shown in FIG. 8(a) presents the values determined as database parameters by the virtual database manager 275 to the user as name-value pairs 810. The user is allowed to change the parameter values and save the updated parameters using a button 815. The saved parameter values can be applied by the virtual database manager 275 to subsequent virtual databases created by the user. In an embodiment, the saved parameter values are used for subsequent virtual databases created using the same source database and may be specific to each source database.

The user interface shown in FIG. 8(b) allows the user to specify a database name 820 or identifier value for uniquely identifying the virtual database being created. The user can specify scripts 830 comprising instructions to be executed before creating the virtual database and/or scripts 840 comprising instructions to be executed after creating the virtual database. The user can also specify file paths or names for the files used in the file structure created for the virtual database. For example, certain database applications require a specific type of file structure for the database. The required file structure can be obtained by the user by specifying the file paths and/or names of the files created for the virtual database.

Figure 9:
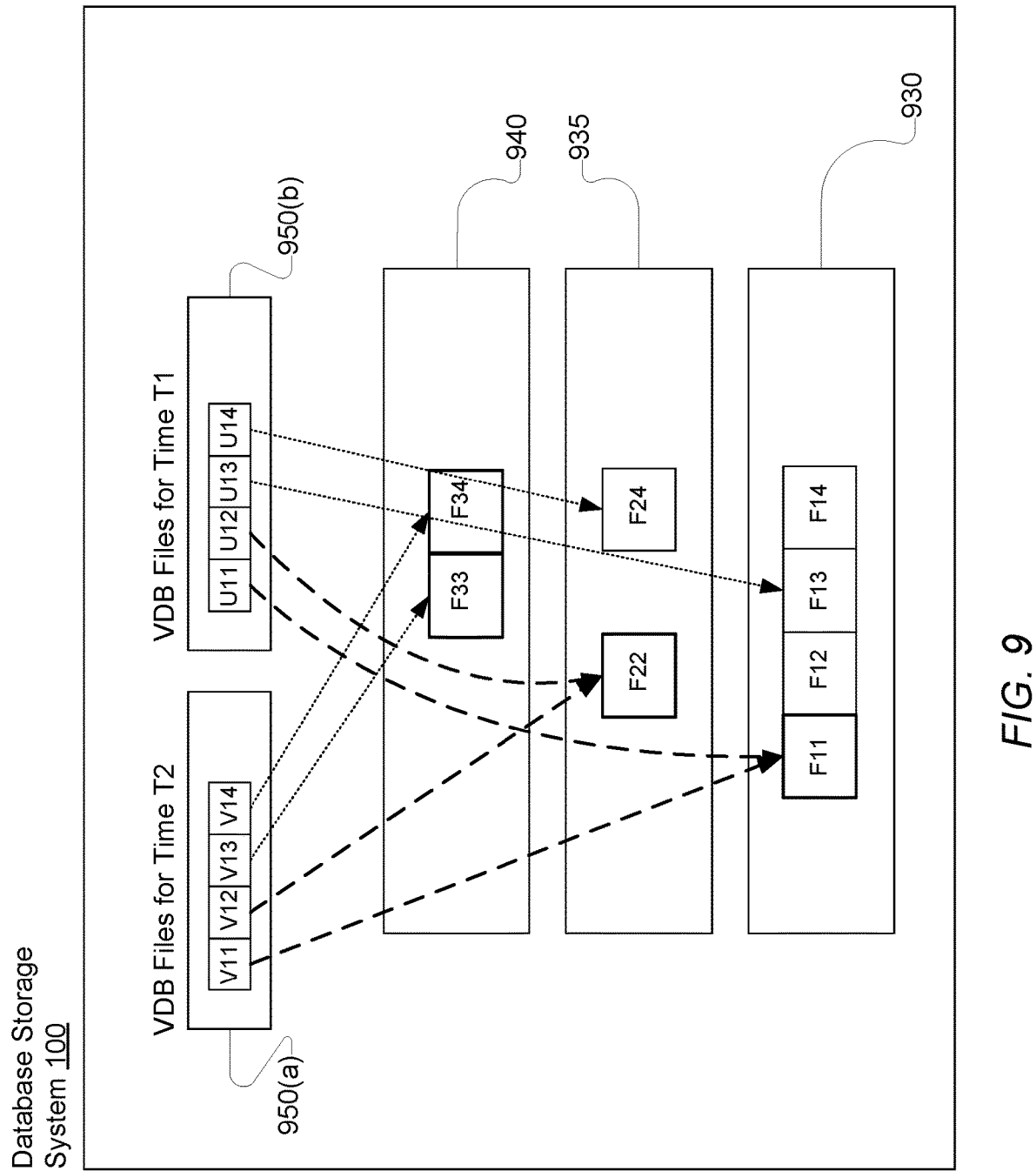
FIG. 9 illustrates how database blocks stored on the storage system data store may be shared by file structures created for different VDBs, in accordance with an embodiment of the invention.

FIG. 9 illustrates how database blocks stored on the storage system data store 290 may be shared by file structures created for different VDBs. FIG. 9 shows the file structures created for VDBs. As shown in FIG. 9, the block V13 and V14 of the file structure 950(a) point at the latest copy of the blocks F33 and F34 that are not shared with the VDB files 950(b). However, block V11 of VDB files 950(a) shares block F11 with block U11 of VDB files 1150(b). Similarly block V12 of 950(a) shares database block F22 with block U12 of 950(b). The sharing of blocks across multiple VDBs results in efficiently utilization of data stored in the storage system data store 290. In case, one of the VDBs attempts to write to a shared database block, a copy of the shared database block is made for the VDB attempting to write. The remaining VDBs that shared the database block continue to share the original database block. Accordingly, any changes to the copied database block are not visible to the remaining VDBs since the changes are specific to the VDB that is writing to the database block.

A VDB may be created using a point-in-time copy of another VDB as a source. For example, assume VDB1 is created and provisioned to a virtual database system 130. Database blocks associated with the VDB are copied when the virtual database system 130 writes to the database blocks for the first time. Point-in-time copies of VDB1 are also made based on a predefined schedule. This allows a user to create a second virtual database VDB2 based on a point-in-time copy of VDB1. Transaction logs of VDB1 are also stored, allowing a user to create the second virtual database VDB2 based on any previous state of VDB1 that may be in-between point-in-time copies of VDB1.

The virtual database system 130 is allowed to read from the file structures created for a VDB as well as write to them. When the virtual database system 130 writes to a block Vij, space is allocated for the database block and the data of the corresponding database block copied to the space allocated. For example, if the virtual database system 130 writes to the block V11, space is allocated and block F11 copied to the allocated block. Hence the original copy of the block F11 is maintained as a read only copy and the virtual database system 130 is allowed to write to a copy of the appropriate database block created specifically for the virtual database system 130. This can be considered a lazy mechanism for creating copies of the database blocks that copies a database blocks only if the corresponding virtual database system 130 writes to the database block. Since the number of blocks that a virtual database system 130 writes to may be a small fraction of the total number of blocks associated with the VDB, the above structure stores the data associated with the VDB in a highly storage efficient manner. A database block that is not written to by virtual database systems 130 may be shared by several virtual database systems without being copied for a specific virtual database systems 130.

FIG. 10 shows the user interface for specifying various policies associated with entities associated with the database storage system 100, in accordance with an embodiment of the invention. These include policies associated with source databases, groups of source databases, point-in-time copies of source databases, and virtual databases. A policy can specify a schedule for repeating a given action at a specific time in future or at a periodic interval, for example, at a particular time every day, or on certain days of the week. For certain long running tasks, the policy may specify a time interval during which the action should be performed. If the action is not completed during the specified time interval, the action is resumed at a subsequent time period specified by the schedule. FIG. 10 shows an example schedule 1050 that performs or repeats an action during a specific time interval each day of the week. For example, this time interval may corresponds to a period when the system has low load. This time is preferable for performing tasks that are likely to slow down other operations significantly.

A user can specify policies 1010 for scheduling the operation of the initial copy of a source database to the database storage system 100. The initial copy of the database can take significant amount of time, depending on the size of the source database. For example, for large source databases, the initial database copy can take several hours. The user can specify policies defining when the initial copy operation is performed. For example, the user can specify intervals of time when the work load on the database storage system 100 is low, thereby allowing the database storage system 100 to devote more resources to the database copy operation and avoid affecting a large number of other operations during the process of copying.

A user can specify policies 1020 describing a schedule for making point-in-time copies of source databases. The source databases can include productions databases and virtual databases. The policies 1010 may be specified for a group of source databases. A policy specified for a group of source databases is applicable to each source databases, unless overwritten by a policy for a specific source database in the group. Since a point-in-time copy takes significantly less time compared to an initial copy of the source databases, the point-in-time copy can be performed in one continuous time interval. Accordingly, the schedule for making point-in-time copies specifies a frequency at which the point-in-time copies are made.

Figure 11:
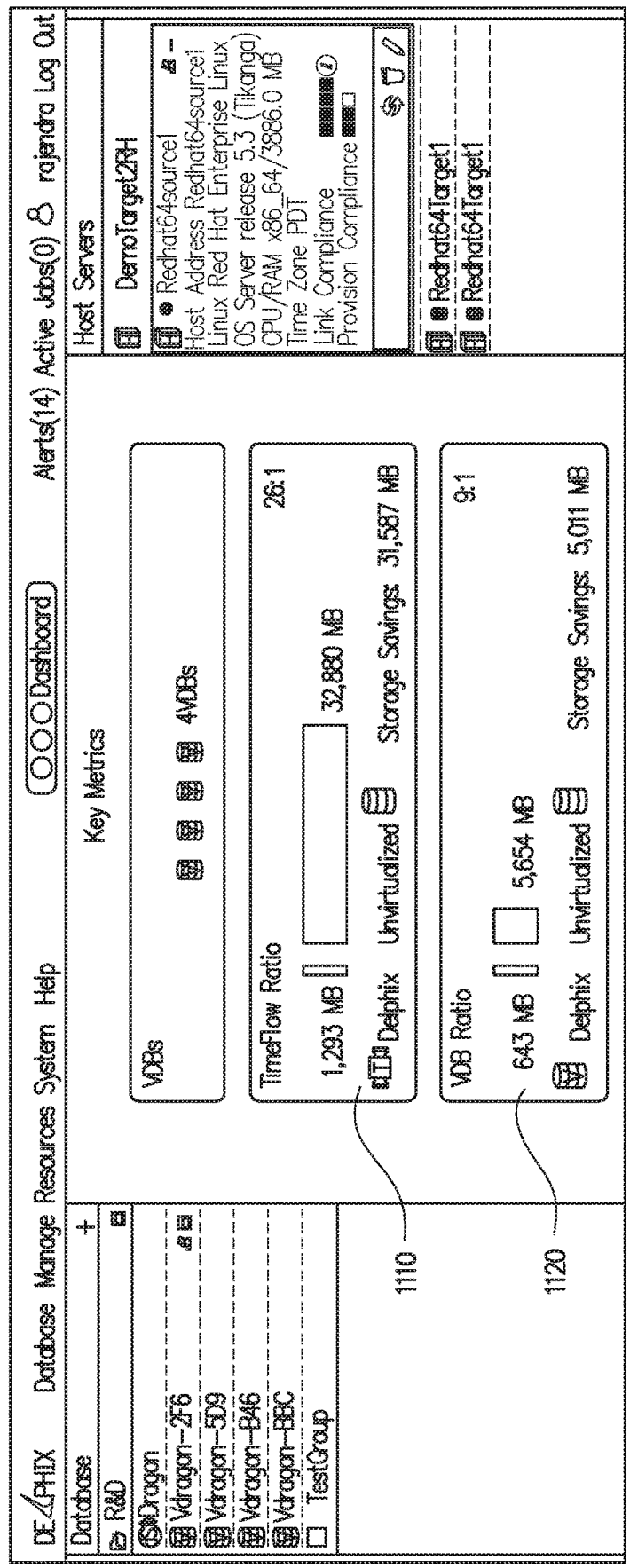
FIG. 11 shows metrics that provide a quantitative measure of storage savings as a result of use of the database storage system 100, in accordance with an embodiment of the invention.

FIG. 11 shows metrics that provide a quantitative measure of storage savings as a result of use of the database storage system 100, in accordance with an embodiment of the invention. Metrics indicating storage savings comprise ratios based on size of storage required for storing virtual database compared with size of storage required for storing the same database conventionally (when the virtualization mechanisms described herein are not utilized). A conventional database storage corresponds to a database storage that does not share database blocks across multiple virtual databases. The storage required for a virtual database can change over time if updates are performed to the database. Some applications may typically require frequent updates whereas other applications perform updates less frequently.

The following equation provides a quantitative measure of storage savings obtained by utilizing a set S of virtual databases.

$$vdbRatio = \frac{\sum_S db_{uv}}{\sum_S db_v} \quad (1)$$

The metric is called vdbRatio (VDB ratio) and is obtained by taking the ratio of size of storage of unvirtualized database (databases stored using conventional techniques) and the size of storage of virtual databases. The variable $db_{uv}$ represents size of storage of an unvirtualized database. The symbol $$\sum_S$$

indicates summation of a parameter associated with each database, the summation computed over all databases belonging to a set S of databases. The variable $db_v$ represents size of storage occupied by a virtualized database.

The following equation provides a quantitative measure of storage savings provided by the information stored in the database storage system 100 based on the mechanisms described herein, for example, as a result of reusing database blocks across point-in-time copies of source databases.

$$timeFlowRatio = \frac{\sum_S dSource_{uv} + \sum_S SS_{uv} + \sum_S dbLog_{uv}}{\sum_S dSource_v + \sum_S SS_v + \sum_S dbLog_v} \quad (2)$$

The metric determined using equation (2) is called timeFlowRatio (time-flow ratio). The symbol $$\sum_S$$

indicates summation of a parameter associated with each database, the summation computed over all databases belonging to a set S of databases. The variable $dSource_v$ represents the size of the storage occupied by the data blocks obtained initially from each source database. The variable $SS_v$ represents size of storage occupied by each point-in-time copy obtained from the source database stored in virtualized form such that database blocks that do not change between two consecutive point-in-time copies are shared. The variable $dbLog_v$ represents size of storage occupied by the database logs obtained from the source database from a given point in time stored in virtualized form. The $dSource_{uv}$, $SS_{uv}$, and $dbLog_{uv}$ corresponds to the above size of the storage occupied by the data blocks obtained initially, size of storage occupied by each point-in-time copy, and size of storage occupied by the database logs corresponding to each database when the information is stored in unvirtualized form. In an embodiment, the variables $dSource_{uv}$, $SS_{uv}$, and $dbLog_{uv}$ represent the size of the corresponding information as the source database stores it, assuming the source database is a conventional database and not a virtual database.

Other variations of the metric indicated in equations (1) and (2) can be used, for example, the inverse of the ration can be used or the two values corresponding to the numerator and denominator presented separately. FIG. 11 illustrates how the VDB ratio 1120 and the time-flow ratio 1110 can be presented to a user in graphical form. As shown in FIG. 11, geometric shapes represent the numerator and the denominator values such that the size of the geometric shape corresponds to the value represented. As shown in FIG. 11, the geometric shapes are rectangular but could be other shapes, for example, circular or elliptical.

Figure 12:
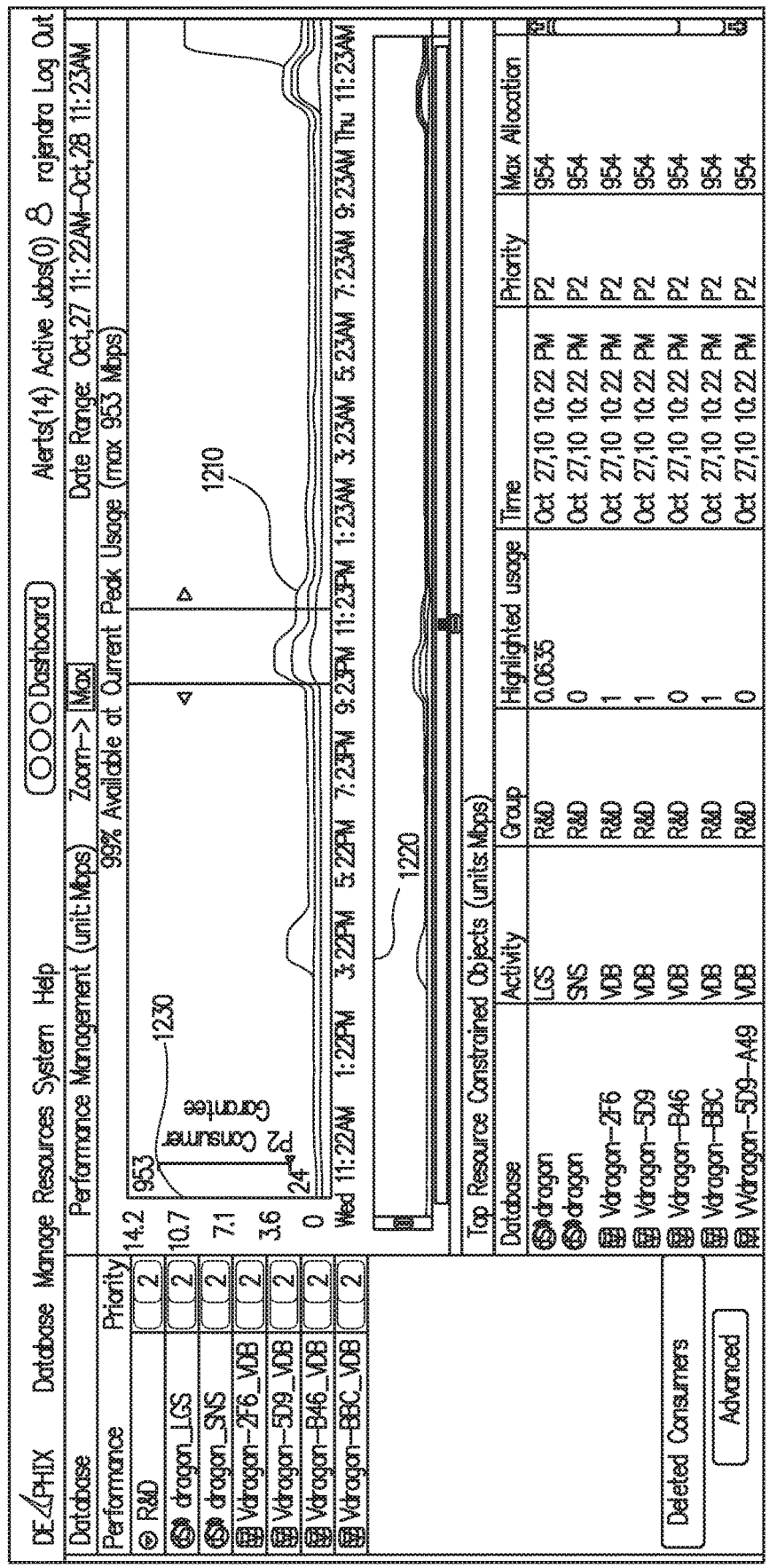
FIG. 12 shows performance of the database storage system at various points in time, in accordance with an embodiment of the invention.

FIG. 12 shows the metrics indicating performance of the database storage system at various points in time, in accordance with an embodiment of the invention. The x-axis 1220 displays the time for which the performance of the database storage system is presented and the graphs 1210 along the y-axis 1230 indicate the performance. Each graph 1210 corresponds to a current task that is active.

Figure 13:
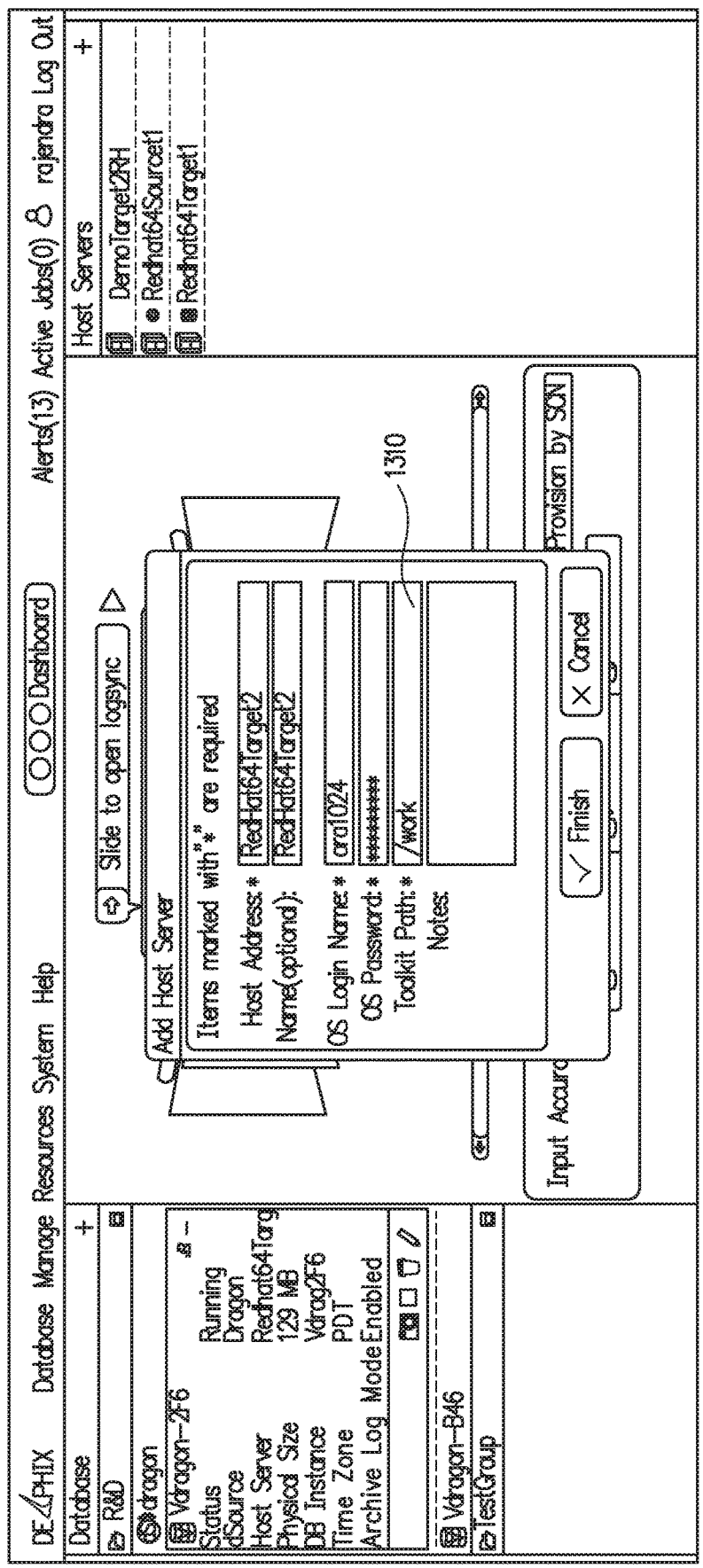
FIG. 13 shows the user interface for allowing a user to add a host server to the database storage system, in accordance with an embodiment of the invention.

FIG. 13 shows the user interface for allowing a user to add a host server to the database storage system, in accordance with an embodiment of the invention. This user interface can be used to add a host server that acts as a production database systems 110 as well as virtual database system 130. The user provides information 1310 identifying the host server including the host name and/or host address, and authentication information required for accessing the host server including the login and password. The authentication information allows the database storage system 100 to access the host server in order to install program code on the host server and to be able to access information from the host server, for example, from source databases. The user interface can also allow the user to specify a toolkit path that specifies where the program code is installed on the host server.

Computing Machine Architecture

Figure 14:
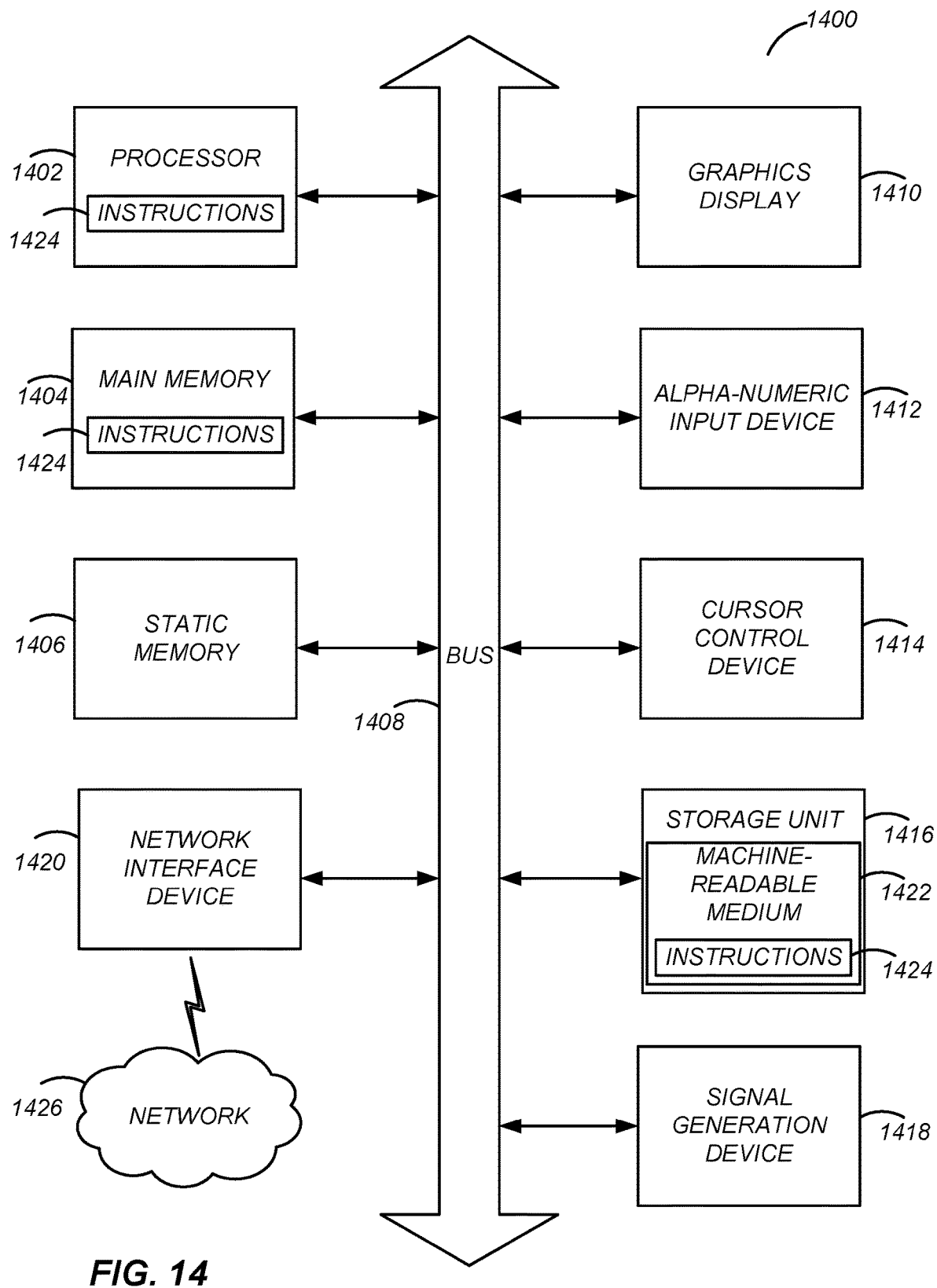
FIG. 14 illustrates an embodiment of a computing machine that can read instructions from a machine-readable medium and execute the instructions in a processor or controller.

FIG. 14 is a block diagram illustrating components of an example machine able to read instructions from a machine-readable medium and execute them in a processor (or controller). Specifically, FIG. 14 shows a diagrammatic representation of a machine in the example form of a computer system 1400 within which instructions 1424 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1424 (sequential or otherwise) that specify actions to be taken by that machine. Further, while only a single machine is illustrated, the term "machine" shall also be taken to include any collection of machines that individually or jointly execute instructions 1424 to perform any one or more of the methodologies discussed herein.

The example computer system 1400 includes a processor 1402 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1404, and a static memory 1406, which are configured to communicate with each other via a bus 1408. The computer system 1400 may further include graphics display unit 1410 (e.g., a plasma display panel (PDP), a liquid crystal display (LCD), a projector, or a cathode ray tube (CRT)). The computer system 1400 may also include alphanumeric input device 1412 (e.g., a keyboard), a cursor control device 1414 (e.g., a mouse, a trackball, a joystick, a motion sensor, or other pointing instrument), a storage unit 1416, a signal generation device 1418 (e.g., a speaker), and a network interface device 1420, which also are configured to communicate via the bus 1408.

The storage unit 1416 includes a machine-readable medium 1422 on which is stored instructions 1424 (e.g., software) embodying any one or more of the methodologies or functions described herein. The instructions 1424 (e.g., software) may also reside, completely or at least partially, within the main memory 1404 or within the processor 1402 (e.g., within a processor's cache memory) during execution thereof by the computer system 1400, the main memory 1404 and the processor 1402 also constituting machine-readable media. The instructions 1424 (e.g., software) may be transmitted or received over a network 1426 via the network interface device 1420.

While machine-readable medium 1422 is shown in an example embodiment to be a single medium, the term "machine-readable medium" should be taken to include a single medium or multiple media (e.g., a centralized or distributed database, or associated caches and servers) able to store instructions (e.g., instructions 1424). The term "machine-readable medium" shall also be taken to include any medium that is capable of storing instructions (e.g., instructions 1424) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A method of creating a virtual database system, the method comprising:
configuring for presentation, by a database storage system, a first user interface comprising:
a first display area configured to display interface elements for selecting a source database from a plurality of source databases;
a second display area configured to display interface elements for selecting a point-in-time from at least one point-in-time associated with a source database of the plurality of source databases, the interface elements comprising at least a geometric shape, wherein a position in the geometric shape corresponds to a time value;
a third display area configured to display interface elements for selecting a destination database server from at least one available destination database server for accessing the virtual database being created;
receiving from a user via the first user interface:
a selection of a source database from the plurality of source databases indicated in the first display area;
a selection of a point-in-time value associated with the selected source database of the at least one point-in-time indicated in the second display area, by:
receiving a selection of a position in the geometric shape; and
mapping the selection of the position in the geometric shape to the point-in-time value;
a selection of a destination database of the at least one available destination database server indicated in the third display area;
creating the virtual database on the database storage system, wherein the created virtual database stores data corresponding to a state of the selected source database, the state associated with the selected point in time, wherein the created virtual database shares database blocks with one or more other virtual databases stored in the database storage system, wherein each database block includes metadata associated with the database block; and
providing access to the selected destination database server, the access for allowing the selected destination database server to perform read and write operations on the created virtual database.

2. The method of claim 1, further comprising:
in response to receiving the selection of the source database from the plurality of source databases indicated in the first display area, updating the second display area to indicate at least one point-in-time associated with the selected source database.

3. The method of claim 1, wherein a position in the geometric shape corresponds to database operations in the selected source database, and wherein mapping the selection of the position in the geometric shape to the point-in-time value comprises:
mapping the selection of the position in the geometric shape to a database operation performed in the selected source database and
determining the point-in-time based on a time of execution of the database operation.

4. The method of claim 1, wherein the selected source database is one of: a live production database; a storage level snapshot of a production database; a clone of a production database; or a previously created virtual database.

5. The method of claim 1, further comprising: determining a metric representing storage savings obtained as a result of storing data in the created virtual database, the metric based on a measure of storage used by the created virtual database and a measure of storage used by the selected source database; and configuring for display a second user interface, the second user interface configured to display the metric.

6. The method of claim 1, further comprising: determining a metric representing storage savings obtained as a result of storing data in the created virtual databases based on the selected source database, the metric based on an estimate of an amount of storage used in virtualized form compared to an estimate of an amount of storage used in unvirtualized form, the storage used for storing: database blocks obtained initially by the database storage system from the selected source database, database blocks for one or more point-in-time copies of the selected source database stored on the database storage system, and transaction logs obtained by the database storage system associated with the selected source database; and configuring for display a second user interface, the second user interface configured to display the metric.

7. The method of claim 1, wherein creating the virtual database on the database storage system comprises creating, by the database storage system, the virtual database based on a stored point-in-time copy of the selected source database associated with a first point-in-time prior to the selected point-in-time, and one or more transaction logs received after the first point in time.

8. The method of claim 1, further comprising: configuring for display a set of one or more parameters of the selected source database; receiving from the user at least one modification to a parameter of the set of parameters; creating the virtual database based upon the modified set of parameters.

9. A non-transitory computer readable storage medium storing instructions for:
configuring for presentation, by a database storage system, a first user interface comprising:
a first display area configured to display interface elements for selecting a source database from a plurality of source databases;
a second display area configured to display interface elements for selecting a point-in-time from at least one point-in-time associated with a source database of the plurality of source databases, the interface elements comprising at least a geometric shape, wherein a position in the geometric shape corresponds to a time value;
a third display area configured to display interface elements for selecting a destination database server from at least one available destination database server for accessing the virtual database being created;
receiving from a user via the first user interface:
a selection of a source database from the plurality of source databases indicated in the first display area;
a selection of a point-in-time value associated with the selected source database of the at least one point-in-time indicated in the second display area, by:
receiving a selection of a position in the geometric shape; and
mapping the selection of the position in the geometric shape to the point-in-time value;
a selection of a destination database of the at least one available destination database server indicated in the third display area;
creating the virtual database on the database storage system, wherein the created virtual database stores data corresponding to a state of the selected source database, the state associated with the selected point in time, wherein the created virtual database shares database blocks with one or more other virtual databases stored in the database storage system, wherein each database block includes metadata associated with the database block; and
providing access to the selected destination database server, the access for allowing the selected destination database server to perform read and write operations on the created virtual database.

10. The non-transitory computer readable storage medium of claim 9, further storing instructions for:
in response to receiving the selection of the source database from the plurality of source databases indicated in the first display area, updating the second display area to indicate at least one point-in-time associated with the selected source database.

11. The non-transitory computer readable storage medium of claim 9, wherein a position in the geometric shape corresponds to database operations in the selected source database, and wherein mapping the selection of the position in the geometric shape to the point-in-time value comprises:
mapping the selection of the position in the geometric shape to a database operation performed in the selected source database; and
determining the point-in-time based on a time of execution of the database operation.

12. The non-transitory computer readable storage medium of claim 9, wherein the selected source database is one of:
a live production database;
a storage level snapshot of a production database;
a clone of a production database; or
a previously created virtual database.

13. The non-transitory computer readable storage medium of claim 9, further storing instructions for:
determining a metric representing storage savings obtained as a result of storing data in the created virtual database, the metric based on a measure of storage used by the created virtual database and a measure of storage used by the selected source database; and
configuring for display a second user interface, the second user interface configured to display the metric.

14. The non-transitory computer readable storage medium of claim 9, further storing instructions for:
determining a metric representing storage savings obtained as a result of storing data in the created virtual databases based on the selected source database, the metric based on an estimate of an amount of storage used in virtualized form compared to an estimate of an amount of storage used in unvirtualized form, the storage used for storing:
database blocks obtained initially by the database storage system from the selected source database,
database blocks for one or more point-in-time copies of the selected source database stored on the database storage system, and
transaction logs obtained by the database storage system associated with the selected source database; and
configuring for display a second user interface, the second user interface configured to display the metric.

15. The non-transitory computer readable storage medium of claim 9, wherein creating the virtual database on the database storage system comprises creating, by the database storage system, the virtual database based on a stored point-in-time copy of the selected source database associated with a first point-in-time prior to the selected point-in-time, and one or more transaction logs received after the first point in time.

16. The non-transitory computer readable storage medium of claim 9, further storing instructions for:
configuring for display a set of one or more parameters of the selected source database;
receiving from the user at least one modification to a parameter of the set of parameters;
creating the virtual database based upon the modified set of parameters.

17. A computer system comprising:
a processor; and
a non-transitory computer readable storage medium storing instructions for execution by the processor, the instructions for:
configuring for presentation, by a database storage system, a first user interface comprising:
a first display area configured to display interface elements for selecting a source database from a plurality of source databases;
a second display area configured to display interface elements for selecting a point-in-time from at least one point-in-time associated with a source database of the plurality of source databases, the interface elements comprising at least a geometric shape, wherein a position in the geometric shape corresponds to a time value;
a third display area configured to display interface elements for selecting a destination database server from at least one available destination database server for accessing the virtual database being created;
receiving from a user via the first user interface:
a selection of a source database from the plurality of source databases indicated in the first display area;
a selection of a point-in-time value associated with the selected source database of the at least one point-in-time indicated in the second display area, by:
receiving a selection of a position in the geometric shape; and
mapping the selection of the position in the geometric shape to the point-in-time value;
a selection of a destination database of the at least one available destination database server indicated in the third display area;
creating the virtual database on the database storage system, wherein the created virtual database stores data corresponding to a state of the selected source database, the state associated with the selected point in time, wherein the created virtual database shares database blocks with one or more other virtual databases stored in the database storage system, wherein each database block includes metadata associated with the database block; and
providing access to the selected destination database server, the access for allowing the selected destination database server to perform read and write operations on the created virtual database.

18. The system of claim 17, wherein creating the virtual database on the database storage system comprises creating, by the database storage system, the virtual database based on a stored point-in-time copy of the selected source database associated with a first point-in-time prior to the selected point-in-time, and one or more transaction logs received after the first point in time.

* * * * *